(12) United States Patent
Andersch et al.

(10) Patent No.: US 7,873,664 B2
(45) Date of Patent: *Jan. 18, 2011

(54) SYSTEMS AND COMPUTER PROGRAM PRODUCTS TO BROWSE DATABASE QUERY INFORMATION

(75) Inventors: Christian Andersch, Schwerin (DE);
Marlene L. Coates, Hayward, CA (US);
Guilherme Saueressig, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 462 days.

This patent is subject to a terminal disclaimer.

(21) Appl. No.: 11/971,157

(22) Filed: Jan. 8, 2008

(65) Prior Publication Data

US 2008/0133582 A1    Jun. 5, 2008

Related U.S. Application Data

(63) Continuation of application No. 10/144,347, filed on May 10, 2002, now Pat. No. 7,447,687.

(51) Int. Cl.
*G06F 17/30* (2006.01)
(52) U.S. Cl. .................. 707/791; 707/601; 707/602; 707/608; 707/802; 707/828
(58) Field of Classification Search .......... 707/600–831
See application file for complete search history.

(56) References Cited

U.S. PATENT DOCUMENTS 5,537,524 A    7/1996   Aprile
5,594,897 A    1/1997   Goffman
5,692,107 A    11/1997  Simoudis et al.

(Continued)

FOREIGN PATENT DOCUMENTS

JP    9106331    4/1997

(Continued)

OTHER PUBLICATIONS

Albrecht, J., W. Hummer, W. Lehner, and L. Schlesinger, "Query Optimization by Using Derivability in a Data Warehouse Environment", DOLAP 2000, 2000 ACM, pp. 49-56.

(Continued)

*Primary Examiner*—Isaac M Woo
(74) *Attorney, Agent, or Firm*—Janaki K. Davda; Konrad Raynes & Victor LLP

(57) ABSTRACT

Systems and computer products that efficiently determine how columns, tables, and queries associated with a database are related to each other. The present invention enables a user to see at a glance in which queries certain columns and tables are used. The present invention may be implemented with a query miner module that includes a query browser module that improves browsing through queries and their components over the past. The preferred embodiment of the present invention provides an easy to use graphical interface showing the queries, tables, and columns in a tree structure. Further, the preferred embodiment of the present invention presents information about relationships and dimensions associated with a database and about columns, tables, and queries to the user without discernable lag time between the user's request and the generated information.

10 Claims, 13 Drawing Sheets

U.S. PATENT DOCUMENTS

| | | |
|---|---|---|
| 5,692,175 A | 11/1997 | Davies et al. |
| 5,706,494 A | 1/1998 | Cochrane et al. |
| 5,748,188 A | 5/1998 | Hu et al. |
| 5,767,854 A | 6/1998 | Anwar |
| 5,832,475 A | 11/1998 | Agrawal et al. |
| 5,832,496 A | 11/1998 | Anand et al. |
| 5,870,746 A | 2/1999 | Knutson et al. |
| 5,905,985 A | 5/1999 | Malloy et al. |
| 5,918,232 A | 6/1999 | Pouschine et al. |
| 5,926,815 A | 7/1999 | James, III |
| 5,926,818 A | 7/1999 | Malloy |
| 5,943,668 A | 8/1999 | Malloy et al. |
| 5,960,423 A | 9/1999 | Chaudhuri et al. |
| 5,978,788 A | 11/1999 | Castelli et al. |
| 5,991,754 A | 11/1999 | Raitto et al. |
| 6,003,024 A | 12/1999 | Bair et al. |
| 6,003,036 A | 12/1999 | Martin |
| 6,031,977 A | 2/2000 | Pettus |
| 6,092,064 A | 7/2000 | Aggarwal et al. |
| 6,115,547 A | 9/2000 | Ghatate et al. |
| 6,122,636 A | 9/2000 | Malloy et al. |
| 6,134,532 A | 10/2000 | Lazarus et al. |
| 6,144,962 A | 11/2000 | Weinberg et al. |
| 6,175,836 B1 | 1/2001 | Aldred |
| 6,205,447 B1 | 3/2001 | Malloy |
| 6,226,647 B1 | 5/2001 | Venkatasubramanian et al. |
| 6,249,791 B1 | 6/2001 | Osborn et al. |
| 6,292,797 B1 | 9/2001 | Tuzhilin et al. |
| 6,308,168 B1 | 10/2001 | Dovich et al. |
| 6,317,750 B1 | 11/2001 | Tortolani et al. |
| 6,324,533 B1 | 11/2001 | Agrawal et al. |
| 6,327,574 B1 | 12/2001 | Kramer et al. |
| 6,339,776 B2 | 1/2002 | Dayani-Fard et al. |
| 6,362,823 B1 | 3/2002 | Johnson et al. |
| 6,366,903 B1 | 4/2002 | Agrawal et al. |
| 6,374,234 B1 | 4/2002 | Netz |
| 6,385,604 B1 | 5/2002 | Bakalash et al. |
| 6,385,609 B1 | 5/2002 | Barshefsky et al. |
| 6,408,292 B1 | 6/2002 | Bakalash et al. |
| 6,418,428 B1 | 7/2002 | Bosch et al. |
| 6,421,665 B1 | 7/2002 | Brye et al. |
| 6,438,537 B1 | 8/2002 | Netz et al. |
| 6,449,609 B1 | 9/2002 | Witkowski |
| 6,477,536 B1 | 11/2002 | Pasumansky et al. |
| 6,480,836 B1 | 11/2002 | Colby et al. |
| 6,484,179 B1 | 11/2002 | Roccaforte |
| 6,539,371 B1 | 3/2003 | Bleizeffer et al. |
| 6,542,895 B1 | 4/2003 | DeKimpe et al. |
| 6,546,381 B1 | 4/2003 | Subramanian et al. |
| 6,546,395 B1 | 4/2003 | DeKimpe et al. |
| 6,567,796 B1 | 5/2003 | Yost et al. |
| 6,574,619 B1 | 6/2003 | Reddy et al. |
| 6,574,791 B1 | 6/2003 | Gauthier et al. |
| 6,581,054 B1 | 6/2003 | Bogrett |
| 6,581,068 B1 | 6/2003 | Bensoussan et al. |
| 6,604,110 B1 | 8/2003 | Savage et al. |
| 6,609,123 B1 | 8/2003 | Cazemier et al. |
| 6,615,201 B1 | 9/2003 | Seshadri et al. |
| 6,628,312 B1 | 9/2003 | Rao et al. |
| 6,633,882 B1 | 10/2003 | Fayyad et al. |
| 6,633,885 B1 | 10/2003 | Agrawal et al. |
| 6,636,845 B2 | 10/2003 | Chau et al. |
| 6,636,853 B1 | 10/2003 | Stephens, Jr. |
| 6,643,633 B2 | 11/2003 | Chau et al. |
| 6,643,661 B2 | 11/2003 | Polizzi et al. |
| 6,651,055 B1 | 11/2003 | Kilmer et al. |
| 6,654,764 B2 | 11/2003 | Kelkar et al. |
| 6,665,682 B1 | 12/2003 | DeKimpe et al. |
| 6,671,689 B2 | 12/2003 | Papierniak |
| 6,681,223 B1 | 1/2004 | Sundaresan |
| 6,684,207 B1 | 1/2004 | Greenfield et al. |
| 6,694,322 B2 | 2/2004 | Warren et al. |
| 6,697,808 B1 | 2/2004 | Hurwood et al. |
| 6,707,454 B1 | 3/2004 | Barg et al. |
| 6,711,579 B2 | 3/2004 | Balakrishnan |
| 6,711,585 B1 | 3/2004 | Copperman et al. |
| 6,714,940 B2 | 3/2004 | Kelkar |
| 6,768,986 B2 | 7/2004 | Cras et al. |
| 6,775,662 B1 | 8/2004 | Witkowski et al. |
| 6,801,992 B2 | 10/2004 | Gajjar et al. |
| 6,823,334 B2 | 11/2004 | Vishnubhotla et al. |
| 6,831,668 B2 | 12/2004 | Cras et al. |
| 6,842,758 B1 | 1/2005 | Bogrett |
| 6,865,573 B1 | 3/2005 | Hornick et al. |
| 6,871,140 B1 | 3/2005 | Florance et al. |
| 6,898,603 B1 | 5/2005 | Petculescu et al. |
| 6,931,418 B1 | 8/2005 | Barnes |
| 6,947,929 B2 * | 9/2005 | Bruce et al. ........................ 1/1 |
| 6,957,225 B1 | 10/2005 | Zait et al. |
| 6,996,556 B2 | 2/2006 | Boger et al. |
| 7,007,039 B2 | 2/2006 | Chaudhuri et al. |
| 7,051,038 B1 | 5/2006 | Yeh et al. |
| 7,139,764 B2 | 11/2006 | Lee |
| 7,149,983 B1 | 12/2006 | Robertson et al. |
| 7,162,464 B1 | 1/2007 | Miller et al. |
| 7,181,450 B2 | 2/2007 | Malloy et al. |
| 7,188,090 B2 | 3/2007 | Kim et al. |
| 7,191,169 B1 | 3/2007 | Tao |
| 7,203,671 B1 | 4/2007 | Wong |
| 7,246,116 B2 | 7/2007 | Barsness et al. |
| 7,266,565 B2 | 9/2007 | Diab |
| 7,275,024 B2 | 9/2007 | Yeh et al. |
| 7,346,601 B2 | 3/2008 | Chaudhuri et al. |
| 7,430,562 B1 | 9/2008 | Bedell et al. |
| 7,447,687 B2 | 11/2008 | Andersch et al. |
| 7,472,127 B2 | 12/2008 | Malloy et al. |
| 7,480,663 B2 | 1/2009 | Colossi et al. |
| 2001/0026276 A1 | 10/2001 | Sakamoto et al. |
| 2001/0037228 A1 | 11/2001 | Ito et al. |
| 2001/0037327 A1 | 11/2001 | Haas et al. |
| 2001/0047355 A1 | 11/2001 | Anwar |
| 2001/0047364 A1 | 11/2001 | Proctor |
| 2001/0051947 A1 | 12/2001 | Morimoto et al. |
| 2001/0055018 A1 | 12/2001 | Yaginuma et al. |
| 2002/0002469 A1 | 1/2002 | Hillstrom |
| 2002/0029207 A1 | 3/2002 | Bakalash et al. |
| 2002/0073088 A1 | 6/2002 | Beckmann et al. |
| 2002/0078039 A1 | 6/2002 | Cereghini et al. |
| 2002/0087516 A1 | 7/2002 | Cras et al. |
| 2002/0091679 A1 | 7/2002 | Wright |
| 2002/0091681 A1 | 7/2002 | Cras et al. |
| 2002/0095430 A1 | 7/2002 | Eglisson et al. |
| 2002/0122078 A1 | 9/2002 | Markowski |
| 2002/0123993 A1 | 9/2002 | Chau et al. |
| 2002/0124002 A1 | 9/2002 | Su et al. |
| 2002/0129003 A1 | 9/2002 | Bakalash et al. |
| 2002/0129032 A1 | 9/2002 | Bakalash et al. |
| 2002/0138316 A1 | 9/2002 | Katz et al. |
| 2002/0143783 A1 | 10/2002 | Bakalash et al. |
| 2002/0188587 A1 | 12/2002 | McGreevy |
| 2002/0188599 A1 | 12/2002 | McGreevy |
| 2003/0004914 A1 | 1/2003 | McGreevy |
| 2003/0004942 A1 | 1/2003 | Bird |
| 2003/0014397 A1 | 1/2003 | Chau et al. |
| 2003/0033277 A1 | 2/2003 | Bahulkar et al. |
| 2003/0055813 A1 | 3/2003 | Chaudhuri et al. |
| 2003/0055832 A1 | 3/2003 | Roccaforte |
| 2003/0061207 A1 | 3/2003 | Spektor |
| 2003/0071814 A1 | 4/2003 | Jou et al. |
| 2003/0078852 A1 | 4/2003 | Shoen et al. |
| 2003/0078913 A1 | 4/2003 | McGreevy |
| 2003/0081002 A1 | 5/2003 | De Vorchik et al. |
| 2003/0093424 A1 | 5/2003 | Chun et al. |
| 2003/0101202 A1 | 5/2003 | Kelkar et al. |

| | | | |
|---|---|---|---|
| 2003/0115183 | A1 | 6/2003 | Abdo et al. |
| 2003/0115207 | A1 | 6/2003 | Bowman et al. |
| 2003/0126144 | A1 | 7/2003 | O'Halloran et al. |
| 2003/0184588 | A1 | 10/2003 | Lee |
| 2003/0206201 | A1 | 11/2003 | Ly |
| 2003/0212676 | A1 | 11/2003 | Bruce et al. |
| 2003/0225768 | A1 | 12/2003 | Chaudhuri et al. |
| 2004/0006574 | A1 | 1/2004 | Witkowski et al. |
| 2004/0010505 | A1 | 1/2004 | Vishnubhotla |
| 2004/0059705 | A1 | 3/2004 | Wittke et al. |
| 2004/0098415 | A1 | 5/2004 | Bone et al. |
| 2004/0122646 | A1 | 6/2004 | Colossi et al. |
| 2004/0122844 | A1 | 6/2004 | Malloy et al. |
| 2004/0128287 | A1 | 7/2004 | Keller et al. |
| 2004/0128314 | A1 | 7/2004 | Katibah et al. |
| 2004/0139061 | A1 | 7/2004 | Colossi et al. |
| 2004/0181502 | A1 | 9/2004 | Yeh et al. |
| 2004/0181538 | A1 | 9/2004 | Lo et al. |
| 2004/0215626 | A1 | 10/2004 | Colossi et al. |
| 2004/0267774 | A1 | 12/2004 | Lin et al. |
| 2005/0027754 | A1 | 2/2005 | Gajjar et al. |
| 2005/0033730 | A1 | 2/2005 | Chaudhuri et al. |
| 2005/0267868 | A1 | 12/2005 | Liebl et al. |
| 2005/0278290 | A1 | 12/2005 | Bruce et al. |
| 2005/0283494 | A1 | 12/2005 | Colossi et al. |

FOREIGN PATENT DOCUMENTS

| | | |
|---|---|---|
| JP | 9146962 | 6/1997 |
| JP | 10247197 | 9/1998 |
| JP | 2001243242 | 9/2001 |
| JP | 2001243244 | 9/2001 |
| JP | 2002123530 | 4/2002 |
| JP | 2003207348 | 7/2003 |
| WO | 0022493 | 4/2000 |
| WO | 0065479 | 11/2000 |
| WO | 0072165 | 11/2000 |
| WO | 0109768 | 2/2001 |
| WO | 0129690 A2 | 4/2001 |

OTHER PUBLICATIONS

Alcorn, M.H., "Seeing is Believing", [online], 2004, [Retrieved on Jun. 28, 2007], retrieved from the Internet at <URL: http://www.db2mag.com/story/showArticle.jhtml?articleID=17602307>, DB2 Magazine, Quarter 1, vol. 9, No. 1, 2004, 15 pp.

Andres, F., M. Noureddine, K. Ono, and A. Zhang, "Metadata Model, Resource Discovery, and Querying on Large Scale Multidimensional Datasets—The GEREQ Project", Proceedings 2000 Kyoto International Conference on DigitalLibraries: Research and Practice, 2000, pp. 312-319.

Colossi, N., W. Malloy, and B. Reinwald, "Relational extensions for OLAP", IBM Systems Journal, vol. 41, No. 4, 2002, pp. 714-731.

Goil S. and A. Choudhary, "A Parallel Scalable Infrastructure for OLAP and Data Mining", Proceedings of the International Symposium on Database Engineering and Applications, Aug. 1999, 10 pp.

Hedberg S.R., "Parallelism Speeds Data Mining", IEEE Parallel & Distributed Technology, vol. 3, No. 4, Winter 1995, pp. 3-6.

Huynh, T.N., O. Mangisengi, A.M., Tjoa, "Metadata for Object-Relational Data Warehouse", Proceedings of the International Workshop on Design and Management of Data Warehouses, Jun. 2000, 9 pp.

IBM, "IBM QMF for Windows for DB2 Workstation Databases, V7.2—Business Intelligence Starts Here?", [online], 2002 IBM, [Retrieved on Feb. 26, 2002]. Retrieved from the Internet at <URL: http://www.-01.ibm/cgi-bin/common/ssi/ssialias?infotype=an &subtype=ca&htmlfid=897/ENUS202-045&appname=isource &language=enus>.

IBM Query Management Facility, "QMF High Performance Option User's Guide for z/OS and OS/390", IBM Corp., 2002, Version 7, Release 2, 338 pp.

Lumpkin, G. and H. Jakobsson, "Query Optimization in Oracle9i, an Oracle White Paper", [online], Feb. 2002, retrieved from the Internet at <URL: http://www.oracle.com/technology/products/bi/pdf/o9i_optimization_twp.pdf>, 29 pp.

Mullins, C.S., "Get Your Business Where it Needs to Go", [online], 2003, [Retrieved on Jan. 29, 2008], retrieved from the Internet at <URL: http://www.craigmullins.com/db2infra.htm>, 4 pp.

Oracle, "Chapter 4: Discovering the Available Metadata", [online], 2000-2003, [Retrieved on Jun. 28, 2007], retrieved from the Internet at <URL: http://www.stanford.edu/dept/itss/docs/oracle/10g/olap.101/b10335/discover.htm>, 16 pp.

Oracle, "Oracle OLAP Analytic Workspace Java API Reference", [online], 2003, [Retrieved on Jan. 29, 2008], retrieved from the Internet at <URL: http://www.acs.ilstu.edu/docs/oracle/olap.101/b12180/overview-summary.html>, 4 pp.

Oracle, "Oracle9i OLAP Services: Concepts and Administration Guide, Release 9.0.1", [online], Jun. 2001, Oracle Corporation. Retrieved from the Internet at <URL: http://www.peacetech.com/flipper/oracle9i/901_doc/olap.901/a88755/basics3.htm#1007569>, 126 pp.

Pederson, D., K. Riis, and T.B. Pederson, "A Powerful and SQL-Compatible Data Model and Query Language for OLAP", vol. 24, No. 2, Jan.-Feb. 2002, Australian Computer Society, Inc., pp. 121-130.

Pires, C. and J.C. Machado, "Database Query Optimizer with Rule Based Search Engine", [online], 2002. Retrieved from the Internet at <URL: http://lens.cos.ufrj.br/sugarloafplop/2002/papers/Paper1A.pdf>, pp. 158-160.

Poelman, J., "How to Build a Metadata Bridge for DB2 Cube Views", [online], May 2003, [Retrieved on Jan. 29, 2008]. Retrieved from the Internet at <URL: http://www.ibm.com/developerworks/db2/library/techarticle/0305poelman/0305poelman.html>, 15 pp.

Poole, J.D., "Model-Driven Architecture: Vision, Standards and Emerging Technologies", [online], Apr. 2001. Retrieved from the Internet at <URL: http://java.sun.com/products/jmi/pdf/arch.pdf>, 15 pp.

SAP America, Inc., "Mutli-Dimensional Modeling with BW", SAP America white paper, 2000, pp. 1-68.

Shukla, A., P.M. Deshpande, and J.F. Naughton, "Materialized View Selection fro Multi-cube Data Models", vol. 1777, Proceedings of the 7th International Conference on Extending Database Technology: Advances in Database Technology, 2000. EDBT 2000. Springer-Verlag London, UK, pp. 269-284.

Toyama, M., "SuperSQL: An Extended SQL for Database Publishing and Presentation", vol. 27, No. 2, Proceedings of the 1998 ACM SIGMOD International Conference on Management of Data, 1998. Seattle, Washington Jun. 1-4, 1998, 3 pp.

U.S. Appl. No. 09/602,490, filed on Jun. 23, 2000, entitled "System and Method for Web Based Sharing of Search Engine Queries", invented by R. Kraft, 47 pp.

Warshaw, L.B. and D.P. Miranker, "Rule-Based Query Optimization, Revisited", Proceedings of the Eighth International Conference on Information and Knowledge Management, 1999 ACM, pp. 267-275.

Rundensteiner, A.E., A. Koeller, and X. Zhang, "Maintaining Data Warehouses Over Changing Information Sources", Communications of the ACM, Jun. 2000, ACM, vol. 43, No. 6, pp. 57-62.

Chen, Q., "Mining Exceptions and Quantitative Association Rules in OLAP Data Cube", Dissertation, Jul. 1999, Department of Computer Science, University of Science and Technology of China, Simon Fraser University, 113 pp.

Hammer, J. and L. Fu., "CubiST++: Evaluating Ad-Hoc Cube Queries Using Statistics Trees", © 2003 Kluwer Academic Publishers, 113 pp.

Hess, J.T. and J.D. Wells, "Understanding How Metadata and Explanations Can Better Support Data Warehousing Related Decision Support Systems: An Exploratory Case Study", Proceedings of the 35th Annual Hawaii International Conference on System Sciences, © 2002 IEEE, 10 pp.

Schwarz, H., R. Wagner, and B. Mitschang, "Improving the Processing of Decision Support Queries: The Case for a DSS Optimizer", Proceedings of the 2001 International Symposium on Database Engineering and Applications, 2001 IEEE Computer Society, 177 pp.

Shah, K. and A. Sheth, "Infoharness: Managing Distributed, Heterogeneous Information", IEEE Educational Activities Department, Nov. 1999, vol. 3, No. 6, pp. 18-28.

Patent Abstract for JP9106331, published on Apr. 22, 1997, 1 pg.
Patent Abstract for JP9146962, published on Jun. 6, 1997, 1 pg.
Patent Abstract for JP10247197, published on Sep. 14, 1998, 1 pg.
Patent Abstract for JP2003207348, published on Jul. 25, 2003, 1 pg.
Response, Nov. 24, 2004, for International Application No. PCT/GB03/005490, 4 pp.
Response, Mar. 31, 2005, for International Application No. PCT/GB03/005490, 3 pp.
Response, Jun. 12, 2006, for U.S. Appl. No. 10/325,245, 9 pp.
Bird, C.L. and S.G. Chapman, "Viewing Data Within a Three-Dimensional Space by Two-Dimensional Devices", IBM Technical Disclosure Bulletin, vol. 34, No. 12, May 1992, Total 2 pp.
Bito, Y., R. Kero, H. Matsuo, Y. Shintani, and M. Silver, "Interactively Visualizing Data Warehouses", Journal of Healthcare Information Management, vol. 15, No. 2, 2001, Total 10 pp.
Cheung, D.W., B. Zhou, B. Kao, H. Lu, T.W. Lam, and H.F. Ting, "Requirement-Based Data Cube Schema Design", (c) 1999 ACM, Total 8 pp. (Also Proceedings of the Eighth International Conference on Information and Knowledge Management, 1999, pp. 162-169.).
Cheung, D.W., B. Zhou, B. Kao, H. Kan, and S.D. Lee, "Towards the Building of a Dense-Region-Based OLAP System", 2007, Total 27 pp. (Also Data & Knowledge Engineering, vol. 36, Issue 1, Jan. 2001.).
Colliat, G., "OLAP, Relational, and Multidimensional Database Systems", SIGMOD Record, vol. 25, No. 3, Sep. 1996, Total 6 pp.
E.F. Codd Associates, "Providing OLAP to User-Analysts: An IT Mandate", [online] 1998, [retrieved on Oct. 8, 2002], retrieved from the Internet at <URL: http://www.hyperion.com/downloads/olap_to_useranalysts_wp.pdf>, Total 22 pp. (Also (c) 1993 E.F. Codd Associates.).
Eick, S.G., "New Visualization Techniques", SIGGRAPH Computer Graphics Newsletter, vol. 34, No. 1, [online] Feb. 2000, [retrieved on Apr. 8, 2004], retrieved from the Internet at <URL: http://www.siggraph.org/publications/newsletter/v34n1/contributions/Eick.html>, Total 11 pp.
Final Office Action 1, Jan. 5, 2006, for U.S. Appl. No. 10/323,131, Total 14 pp.
Final Office Action 1, Jan. 5, 2006, for U.S. Appl. No. 10/341,763, Total 18 pp.
Final Office Action 1, Mar. 2, 2006, for U.S. Appl. No. 10/410,793, Total 22 pp.
Final Office Action 1, Mar. 27, 2007, for U.S. Appl. No. 10/867,970, Total 21 pp.
Final Office Action 1, Oct. 4, 2007, for U.S. Appl. No. 10/874,398, Total 32 pp.
Final Office Action 2, Nov. 1, 2006, for U.S. Appl. No. 10/341,763, Total 24 pp.
Final Office Action 2, Mar. 27, 2007, for U.S. Appl. No. 10/410,793, Total 23 pp.
Final Office Action 2, Feb. 4, 2008, for U.S. Appl. No. 10/867,970, Total 13 pp.
Final Office Action 3, Apr. 24, 2008, for U.S. Appl. No. 10/410,793, Total 19 pp.
Goil, S., and A. Choudhary, "High Performance Multidimensional Analysis of Large Datasets", Proceedings of the 1st ACM International Workshop on Data Warehousing and OLAP, 1998, Total 6 pp.
Gray, J., S. Chaudhuri, A. Bosworth, A. Layman, D. Reichart, M. Venkatrao, F. Pellow, and H. Pirahesh, "Data Cube: A Relational Aggregation Operator Generalizing Group-By, Cross-Tab, and Sub-Totals", Data Mining and Knowledge Discovery 1, 1997, Total 25 pp.
Howard, J., "DB2 Newsletter", [online], Jun. 2003 [retrieved on Apr. 1, 2009], retrieved from the Internet at <URL: http://txmq.com/resources/newsletter_archive/db2news_jun03.htm>, Total 12 pp.
IBM Corp., "IBM DB2 Information Integrator V8.1", Software Announcement, May 20, 2003, Total 19 pp.
International Preliminary Examination Report, Apr. 11, 2005, for International Application No. PCT/GB03/05490, Total 11 pp.
International Search Report, Apr. 16, 2004, for International Application No. PCT/GB03/05490, Total 5 pp.
Kenan Systems Corporation, "An Introduction to Multidimensional Database Technology", [online], 1993-1995, [retrieved on Apr. 8, 2004], retrieved from the Internet at <URL: http://www.fing.edu.uy/inco/grupos/csi/esp/Cursos/cursos_act/2003DAP_SistDW/Material/ken96.pdf>, Total 29 pp.
Kotidis, Y. and N. Roussopoulos, "An Alternative Storage Organization for ROLAP Aggregate Views Based on Cubetrees", ACM SIGMOD Record, vol. 27, Issue 2, Jun. 1998, Total 10 pp.
Mangisengi, O., A.M. Tjoa, and R.R. Wagner, "Metadata Management Concept for Multidimensional OLAP Data based on Object-Oriented Concepts", (c) 2000 IEEE, Total 9 pp. (Also Proceedings of the First International Conference on Web Information Systems Engineering, 2000, vol. 1, pp. 358-365.).
Maniatis, A.S., P. Vassiliadis, S. Skiadopoulos, and Y. Vassiliou, "Advanced Visualization for OLAP", Proceedings of the 6th ACM International Workshop on Data Warehousing and OLAP, Nov. 2003, Total 8 pp.
Microsoft Corp. and Hyperion Solutions Corp., "XML for Analysis Specification", Version 1.0, updated Apr. 24, 2001, Total 107 pp.
Morgan, R., "Web-Based Interactive Database Query Builder", Dissertation submitted to the University of Bristol, Sep. 2002, Total 101 pp.
Nippl, C. and B. Mitschang, "Topaz: A Cost-Based, Rule-Driven, Multi-Phase Parallelizer", Proceedings of the 24th VLDB Conference, 1998, pp. 251-262.
Notice of Allowance 1, Nov. 4, 2005, for U.S. Appl. No. 10/144,347, Total 8 pp.
Notice of Allowance 1, Apr. 19, 2005, for U.S. Appl. No. 10/144,540, Total 11 pp.
Notice of Allowance 1, May 19, 2006, for U.S. Appl. No. 10/323,131, Total 9 pp.
Notice of Allowance 1, Aug. 22, 2006, for U.S. Appl. No. 10/325,245, Total 11 pp.
Notice of Allowance 1, Nov. 4, 2008, for U.S. Appl. No. 10/867,970, Total 11 pp.
Notice of Allowance 1, Dec. 11, 2008, for U.S. Appl. No. 10/874,397, Total 17 pp.
Notice of Allowance 1, Sep. 3, 2008, for U.S. Appl. No. 10/874,398, Total 16 pp.
Notice of Allowance 2, Oct. 18, 2007, for U.S. Appl. No. 10/144,347, Total 13 pp.
Notice of Allowance 2, Sep. 20, 2006, for U.S. Appl. No. 10/323,131, Total 13 pp.
Notice of Allowance 2, Feb. 8, 2007, for U.S. Appl. No. 10/325,245, Total 8 pp.
Notice of Allowance 3, Jun. 25, 2008, for U.S. Appl. No. 10/144,347, Total 16 pp.
Notice of Allowance 3, Jan. 29, 2009, for U.S. Appl. No. 10/325,245, Total 11 pp.
Office Action 1, Sep. 24, 2004, for U.S. Appl. No. 10/144,347, Total 18 pp.
Office Action 1, Oct. 13, 2004, for U.S. Appl. No. 10/144,540, Total 15 pp.
Office Action 1, Jul. 5, 2005, for U.S. Appl. No. 10/323,131, Total 15 pp.
Office Action 1, Mar. 10, 2006, for U.S. Appl. No. 10/325,245, Total 9 pp.
Office Action 1, Jul. 21, 2005, for U.S. Appl. No. 10/341,763, Total 27 pp.
Office Action 1, Sep. 20, 2005, for U.S. Appl. No. 10/410,793, Total 26 pp.
Office Action 1, Nov. 14, 2006, for U.S. Appl. No. 10/867,970, Total 37 pp.
Office Action 1, Mar. 14, 2007, for U.S. Appl. No. 10/874,397, Total 27 pp.
Office Action 1, Mar. 5, 2007, for U.S. Appl. No. 10/874,398, Total 33 pp.
Office Action 2, May 10, 2005, for U.S. Appl. No. 10/144,347, Total 14 pp.
Office Action 2, Oct. 4, 2007, for U.S. Appl. No. 10/874,397, Total 39 pp.
Office Action 3, Jul. 26, 2006, for U.S. Appl. No. 10/144,347, Total 8 pp.
Office Action 3, May 22, 2006, for U.S. Appl. No. 10/341,763, Total 15 pp.

Office Action 3, Sep. 19, 2006, for U.S. Appl. No. 10/410,793, Total 30 pp.
Office Action 3, Sep. 11, 2007, for U.S. Appl. No. 10/867,970, Total 9 pp.
Office Action 3, Apr. 7, 2008, for U.S. Appl. No. 10/874,397, Total 26 pp.
Office Action 3, Mar. 3, 2008, for U.S. Appl. No. 10/874,398, Total 24 pp.
Office Action 4, Jan. 29, 2007, for U.S. Appl. No. 10/144,347, Total 12 pp.
Office Action 5, Jun. 27, 2007, for U.S. Appl. No. 10/144,347, Total 11 pp.
Office Action 5, Oct. 19, 2007, for U.S. Appl. No. 10/410,793, Total 18 pp.
Office Action 5, May 5, 2008, for U.S. Appl. No. 10/867,970, Total 11 pp.
Office Action 6, Aug. 20, 2008, for U.S. Appl. No. 10/410,793, Total 18 pp.
Office Action 6, Apr. 14, 2009, for U.S. Appl. No. 10/867,970, Total 31 pp.
Office Action 7, Feb. 12, 2009, for U.S. Appl. No. 10/410,793, Total 17 pp.
Pendse, N., "The OLAP Report: What is OLAP?", [online], Updated Jul. 27, 2002, [retrieved on Oct. 8, 2002], retrieved from the Internet at <URL: http://www_olapreport.com/fasmi>, Total 7 pp.
Pokorny, J. and P. Sokolowsky, "A Conceptual Modelling Perspective for Data Warehouses", [online], 1999, [retrieved on Apr. 8, 2004], retrieved from the Internet at <URL: http://wi99.iwi.uni-sb.de/teilnehmer/pdf-files/ EF_32_WiB082.pdf>, Total 20 pp.
Post, L.L. and J.J. Sydir, "Dynamically Configurable User Interface for the Manipulation of Data Objects", IBM TDB, vol. 37, No. 3, Mar. 1994, Total 8 pp.
Rabenhorst, D.A., "Many-Dimensional Visualization Technique", IBM TDB, vol. 35, No. 6, Nov. 1992, Total 3 pp.
Rai, A. and V. Storey, "Data Mining Multidimensional Databases, OLAP (Online Analytical Processing), & Data Warehousing", [online] 2001, [retrieved on Apr. 8, 2004], retrieved from the Internet at <URL: http://www.cis.gsu.edu/~dstraub/JMBA/MBA8473/2001/DataMine3-2ups.pdf>, Total 40 pp.
Raphaely, D., "Oracle 8i Application Developer's Guide- Fundamentals", Release 8.1.5, Part No. A68003-01, Feb. 1999, Total 24 pp.
Sapia, C., M. Blaschka, G. Hofling, and B. Dinter, "Extending the E/R Model for the Multidimensional Paradigm", Proceedings of the Workshops on Data Warehousing and Data Mining: Advances in Database Technologies, 1998, Total 12 pp.
Sifer, M., "A Visual Interface Technique for Exploring OLAP Data with Coordinated Dimension Hierarchies", Proceedings of the Twelfth International Conference on Information and Knowledge Management, Nov. 2003, Total 4 pp.
Stewart, H.M., "OLAP/EIS Tops Off the Data Warehouse", Proceedings of the 1995 Cause Annual Conference, 1995, Total 16 pp.
Stohr, T., R. Muller, and E. Rahm, "An Integrative and Uniform Model for Metadata Management in Data Warehousing Environments", Proceedings of the International Workshop on Design Management of Data Warehouses, 1999, 16 pp.
Stolte, C., D. Tang, and P. Hanrahan, "Query, Analysis, and Visualization of Hierarchically Structured Data Using Polaris", Proceedings of the Eighth ACM SIGKDD International Conference on Knowledge Discovery and Data Mining, 2002, 10 pp.
Supplemental NOA, Sep. 21, 2006, for U.S. Appl. No. 10/325,245, 11 pp.
Tang, D., C. Stolte, and R. Bosch, "Design Choices when Architecting Visualizations", Information Visualization, vol. 3, Iss. 2, 2004, 10 pp.
Vassiliadis, P., "Modeling Multidimensional Databases, Cubes and Cube Operations", Proceedings of the 10th International Conference on Scientific and Statistical Database Management, 1998, 10 pp.
W3C, "XML Path Language (XPath)", Version 1.0, [online], W3C Recommendation Nov. 16, 1999, [retrieved on Oct. 8, 2002], retrieved from the Internet at <URL: http://www.w3/prg/TR/xpath>, 37 pp.
White, C.J., "The IBM Business Intelligence Software Solution", Version 3, DataBase Associates International, Inc., Mar. 2009, 22 pp.
Wolfram Research, Inc., "Hexagonal Prism", [online], 2004, [retrieved on Jun. 6, 2004], retrieved from the Internet at <URL: http://mathworld.wolfram.com/HexagonalPrism.html>, 2 pp.
Wolfram Research, Inc., "Polyhedron", [online], 2004, [retrieved on Jun. 6, 2004], retrieved from the Internet at <URL: http://mathworld.wolfram.com/Polyhedron.html>, 5 pp.
Wolfram Research, Inc., "Prism", [online], 2004, [retrieved on Jun. 6, 2004], retrieved from the Internet at <URL: http://mathworld.wolfram.com/Prism.html>, 5 pp.
Wolfram Research, Inc., "Triangular Prism", [online], 2004, [retrieved on Jun. 6, 2004], retrieved from the Internet at <URL: http://mathworld.wolfram.com/TriangularPrism.html>, 2 pp.
Written Opinion, Sep. 6, 2004, for International Application No. PCT/GB03/05490, 7 pp.
Zhao, Y., P.M. Deshpande, J.F. Naughton, and A. Shukla, "Simultaneous Optimization and Evaluation of Multiple Dimensional Queries", ACM SIGMOD Record, vol. 27, Iss. 2, Jun. 1998, pp. 271-282.
Zhou, B., "ScanChunk: An Efficient Algorithm for Hunting Dense Regions in Data Cube", Abstract Total 1 pp. for Chinese Journal of Computers, vol. 22, No. 6, Jun. 1999, pp. 620-626.
Han, J, S. Nishio, H. Kawano, and W. Wang, "Generalization-Based Data Mining in Object-Oriented Databases Using an Object Cube Model", Data and Knowledge Engineering, vol. 25, 1998, Total 43 pp.
Kamber, M., J. Han, and J.Y. Chiang, "Metarule-Guided Mining of Multi-Dimensional Association Rules Using Data Cubes", Proceedings of the 3rd International Conference on Knowledge Discovery and Data Mining, Aug. 1997, Total 4 pp.
Stefanovic, N., J. Han, and K. Koperski, "Object-Based Selective Materialization for Efficient Implementation of Spatial Data Cubes", IEEE Transactions on Knowledge and Data Engineering, vol. 12, No. 6, Nov./Dec. 2000, Total 21 pp.
Abstract and Machine Translation for JP2001243242, published Sep. 7, 2001, Total 55 pp.
Abstract and Machine Translation for JP2001243244 published Sep. 7, 2001, Total 46 pp.
Abstract for JP2003500741, published Jan. 7, 2003, Total 1 p [Abstract for corresponding case WO0072165].
Abstract for JP2003519418, published Jun. 17, 2003, Total 1 p [Abstract for corresponding case WO0109768].
IDS Report, Jun. 16, 2009, listing art cited by the examiner in the Jun. 2, 2009 Office Action for JP2004-566154, Total 2 pp.
Notice of Allowance 2, Nov. 25, 2009, for U.S. Appl. No. 10/867,970, Total 14 pp.
Notice of Allowance 2, May 29, 2009, for U.S. Appl. No. 10/874,397, Total 10 pp.
Notice of Allowance 4, Jul. 20, 2009, for U.S. Appl. No. 10/325,245, Total 28 pp.
Notice of Allowance 5, Dec. 17, 2009, for U.S. Appl. No. 10/325,245, Total 69 pp.
Office Action 1, May 25, 2009, for Application No. JP2004566154, Total 13 pp. [with translation].
Supplemental NOA, Mar. 24, 2009, for U.S. Appl. No. 10/325,245, Total 3 pp.
BPAI Decision, Dec. 2, 2009, for U.S. Appl. No. 10/341,763, Total 8 pp.
Final Office Action 4, Dec. 9, 2009, for U.S. Appl. No. 10/410,793, Total 56 pp.
Abstract and Machine Translation for JP2002123530, published Apr. 26, 2002, Total 27 pp.
Examiner's Answer, Aug. 7, 2007, for U.S. Appl. No. 10/341,763, Total 19 pp.
Office Action 5, Mar. 30, 2010, for U.S. Appl. No. 10/341,763, Total 55 pp.

* cited by examiner

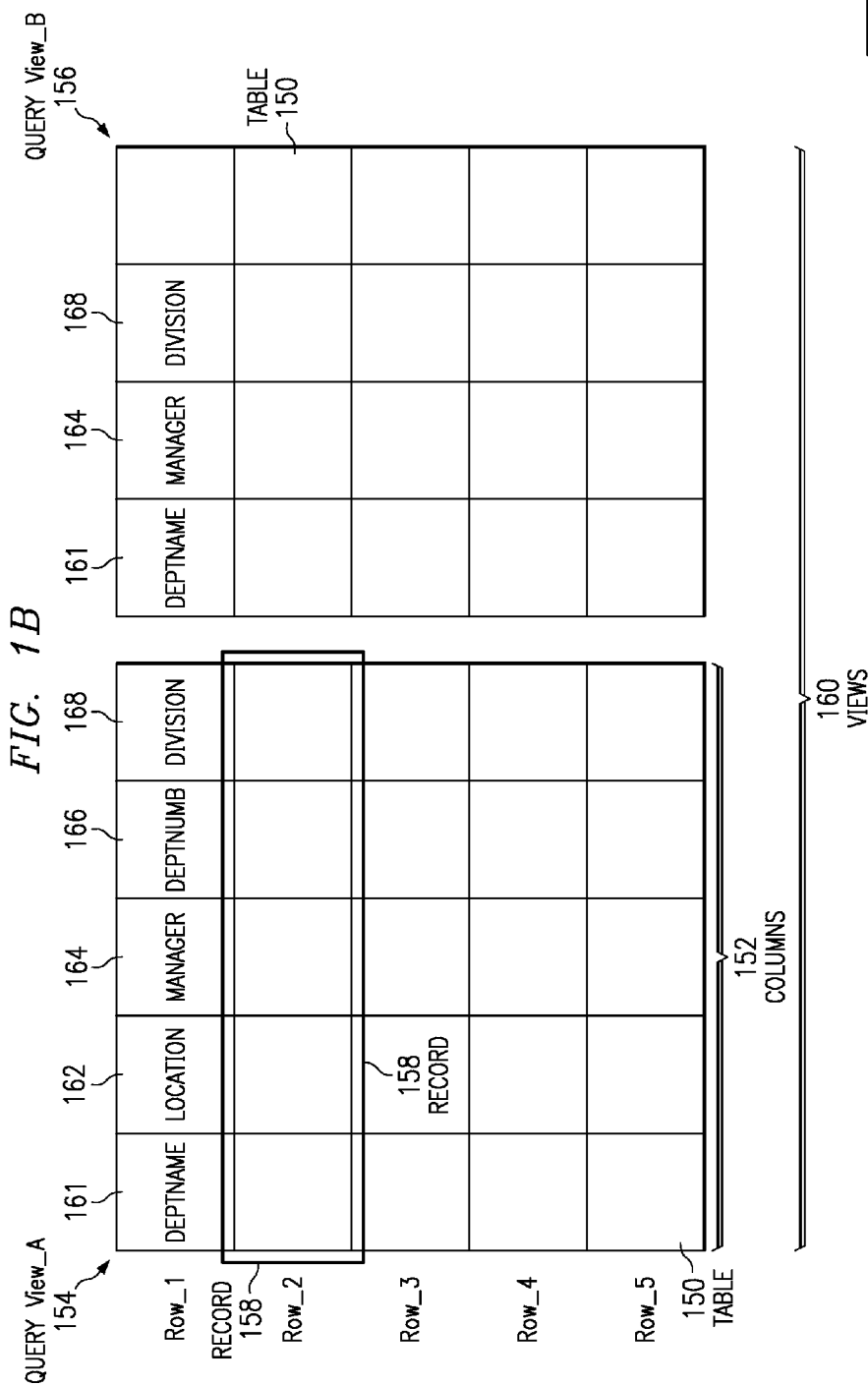

*FIG. 3G*  233

```xml
<?xml version="1.0" encoding="UTF-8" ?>
<QQM xmlns="http://www.w3.org/2001/XMLSchema"
   xmlns:olap="http://www.ibm.com/olap"
   olap:schemalocation="http://www.ibm.com/olap olap.xsd">
  <DIMENSION name="Time">
    <TABLE name="Q.ORG">           111
      <COLUMN name="DEPTNAME" />
    </TABLE>
    <TABLE name="Q.ORG">
      <COLUMN name="DEPTNUMB" />
    </TABLE>
    <TABLE name="Q.ORG">
      <COLUMN name="DIVISION" />
    </TABLE>
  </DIMENSION>
  <DIMENSION name="Sales">
    <TABLE name="Q.STAFF">
      <COLUMN name="COMM" />
    </TABLE>
    <TABLE name="Q.STAFF">
      <COLUMN name="ID" />
    </TABLE>
    <TABLE name="Q.STAFF">
      <COLUMN name="NAME" />
    </TABLE>
  </DIMENSION>
</QQM>
```

SYSTEMS AND COMPUTER PROGRAM PRODUCTS TO BROWSE DATABASE QUERY INFORMATION

CROSS-REFERENCE TO RELATED APPLICATION

This application is a continuation application of and claims the benefit of "METHODS TO BROWSE DATABASE QUERY INFORMATION", issued as U.S. Pat. No. 7,447,687 on Nov. 4, 2008, having application Ser. No. 10/144,347, and filed May 10, 2002, the entire contents of which is incorporated herein by reference.

In U.S. Pat. No. 6,947,929, issued on Sep. 20, 2005, with application Ser. No. 10/144,540, entitled "Systems, Methods, and Computer Program Products to Determine Useful Relationships and Dimensions of a Database," filed on May 10, 2002, by Jay Bruce et. al, assigned to the assignee of the present invention, and incorporated herein in its entirety by this reference, there is described a method of efficiently determining useful relationships and dimensions when employing OLAP processing. Although not limited thereto, the present invention employs such a method in one of its preferred embodiments.

Application Ser. No. 10/144,540 issued as U.S. Pat. No. 6,947,929 on Sep. 20, 2005, and a Statutory Disclaimer was filed for U.S. Pat. No. 6,947,929 on Jan. 10, 2007.

BACKGROUND OF THE INVENTION

1. Field of the Invention

The present invention is directed to the field of database browsing and information mining. It is more particularly directed to browsing database information associated with queries that may mine information associated with a database.

2. Description of the Background Art

A database is a collection of data, organized in the form of tables. A table typically consists of columns that represent attribute types and records that represent specific instances of data associated with the table, and the table has attribute instances associated with the columns. A relational database is a database that may be a set of tables containing information that is manipulated in accordance with the relational model associated with the data. The product marketed under the trademark IBM DB2 stores the data associated with the database in tables, and each table has a name.

On-Line Analytical Processing (OLAP) is a computing technique for summarizing, consolidating, viewing, analyzing, applying formulae to, and synthesizing data according to multiple dimensions. OLAP software enables users, such as analysts, managers, and executives, to gain insight into performance of an enterprise through rapid access to a wide variety of data dimensions that are organized to reflect the multidimensional nature of the enterprise performance data typically by means of hypotheses about possible trends in the data. More particularly, OLAP may be used to analyze corporate data from different viewpoints by identifying interesting associations in the information in a database.

Data mining is a technique employing computer-based techniques to enable users to query structured data stored in computers in forms such as: multidimensional databases, conventional databases, or flat computer files. More particularly, data mining involves extracting computer-based information and enables a user to discover trends about the computer-based information. OLAP is a decision support technique used in data management for the purpose of modeling and analyzing business information, and by means of comparison On-Line Transaction Processing (OLTP) is a technique that may be used to process a computer task immediately upon request, and may employ data from a database. Data mining may be used during OLTP or OLAP processing.

An increasingly popular data model for OLAP applications is the multidimensional database (MDDB). MDDBs are often used by a data analyst for interactive exploration of performance data for finding regions of anomalies in the data that may otherwise be characterized by trends. Problem areas and new opportunities associated with the enterprise are often identified when an anomaly in the enterprise data is located. However, the creation of MDDBs requires computer resources, and it would be useful to be able to efficiently determine relationships and dimensions associated with a database, without relying on a MDDB, when employing OLAP processing techniques.

Each database typically has a set of tables, such as system catalog tables, which are automatically maintained by the computer system and contain information about the tables and other objects that are stored in the database, and about the user of the database and the user's access privileges. Information about the database can be retrieved from the system catalog tables using structured query language (SQL) queries.

SQL is a standardized language for defining and manipulating data in a relational database and may be used during data mining. A query may be an expression whose result is a table. A query searches the records stored in specified tables to find the answer to a question. A query is a request for information from the database based on specific conditions such as, which subset of the data should be retrieved and how the data is to be presented. For example, a request for a list of all departments in a DEPARTMENT table whose budget is greater than $10,000 is an example of a query. It would be useful to understand how database tables and columns, and SQL queries are related to each other when OLAP procedures are employed. Such procedures may analyze, from a hierarchical perspective, data that is above and below the data associated with the query request, and may aggregate the resulting information. Further, the SQL query may analyze the metadata associated with a database. Metadata is information that describes the characteristics of stored data. For instance, data in a database may be described by metadata such as the name of associated database tables and columns.

A browser may be considered a text extender function that enables a user to display text on a computer monitor. Browsing is typically used to examine records in a file, such as a database. By means of example, a browser may operate on one computer, such as a client computer and initiate requests to a second computer, such as a server computer so that information from the second computer may displayed via the first computer. When a user attempts to browse information during OLAP processing, the amount of information may be so large that it is difficult to determine useful dimensions. For example, if a user attempts to browse a database and uses SQL queries it may be difficult to determine how columns, tables, and queries are related to each other.

Given a relational database, it can be difficult to determine useful dimensions when employing OLAP processing. Further, given a set of SQL queries, it can be complicated and time consuming to determine how columns, tables, and queries are related to each other. This is especially true when there are a large number of queries, such as when a user is employing OLAP processing techniques. From the foregoing it will be apparent that there is still a need to improve the determination of how columns, tables, and queries of a database are related to each other so that users can navigate quickly by techniques such as browsing between different views of database information.

SUMMARY OF THE INVENTION

An embodiment of the present invention relates to systems, methods, and computer products that efficiently determine how columns, tables, and queries associated with a database are related to each other. Further, by operation of the present invention improving the determination of how columns, tables, and queries of relational or multidimensional databases are related to each other, users can navigate quickly between different views of database information, such as query information. Techniques of the past have not been able to efficiently determine how columns, tables, and queries associated with a database are related to each other.

The present invention improves the analysis of metadata in a database. The present invention enables a user to take advantage of heuristics for OLAP processing of data. Heuristics are defined herein as user-specific criteria, such as a set of rules, intended to increase the probability of solving a problem associated with a database. The preferred embodiment of the present invention employs a query miner module to analyze query objects based on heuristics that are embodied in SQL statements. For instance, the query miner module may identify and rate queries according to their level of satisfaction of heuristic rules, and show statistics associated with the result of the queries. In one embodiment of the present invention, the query miner module may collect information about the frequency of combinations of table and column information associated with a query so that the user may assess the relationship between the tables and columns of data in a database. Further, the results of searches driven by heuristic rules may be analyzed and reported in a variety of ways that may be used to generate additional user-specific heuristics. For example, heuristic rules may be based on information about various owners of the data, the last used data, or key words in SQL statements. Alternatively heuristic rules may be based on all search fields in the SQL statement. The metadata information about attributes associated with a query, such as tables and columns, and the result of statistical information about the data that is based on heuristic rules, advantageously enables a user to determine useful relationships and attributes, such as dimensions, from a database. The terms "dimension" and "views" will be used interchangeably herein.

The present invention allows easy browsing of queries, tables, and columns, and enables a user to see at a glance in which queries certain columns and tables are used. The present invention may be implemented with a query browser module that improves browsing through queries and their components over the past. The preferred embodiment of the present invention provides an easy to use graphical interface showing query objects associated with queries, tables, and columns in a tree structure. Further, the preferred embodiment of the present invention operates efficiently and presents information about columns, tables, and queries to the user without discernable lag time between the user's request and the generated information.

According to the preferred embodiment of the present invention the table and column information is complete thereby ensuring accurate browsing. Therefore, data collection associated with browsing, such as browsing metadata, and in the preferred embodiment of the present invention is performed against all queries by the query miner module.

An embodiment of the present invention is achieved by systems, methods, and computer products that improve the determination of useful relationships and dimensions associated with a database when employing OLAP processing techniques; and that improve the determination of how columns, tables, and queries of a database are related to each other. The method comprises: (a) creating and propagating a database; (b) executing a query object with the query miner module that may operate in conjunction with the product marketed under the trademark IBM QMF (Query Management Facility) and that is directed to a database; this execution further includes (i) applying user-specific heuristics as rules used by the query miner module via the query object; (ii) applying a data-mining statistical tabulation against the data in the database and metadata associated with the database and therefore collecting statistical information about the query object based on the user-specific heuristics; and (iii) determining useful information by analyzing the statistical information; (c) retrieving at least one view of the statistical information that satisfies the user-specific heuristics; (d) rating the statistical information that satisfies the user-specific heuristics; and (e) presenting the rated statistical information, such as views of table, column, or query information as a user-specific report; the presentation further includes (i) determining if the user wants to use new heuristics and if not; (ii) optionally creating at least one user-specific report and exporting the user-specific report to final report documents, such as XML files; and (iii) if the user wants to use new heuristics repeating the process of executing a query object.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 1 includes FIG. 1A and FIG. 1B;
FIG. 1B is a block diagram that illustrates data tables;
FIG. 2 includes FIG. 2A and FIG. 2B;
FIG. 3G is a block diagram that illustrates the final report.

In the following detailed description and in the several figures of the drawings, like elements are identified with like reference numerals.

DETAILED DESCRIPTION OF THE INVENTION

Figure 1A:
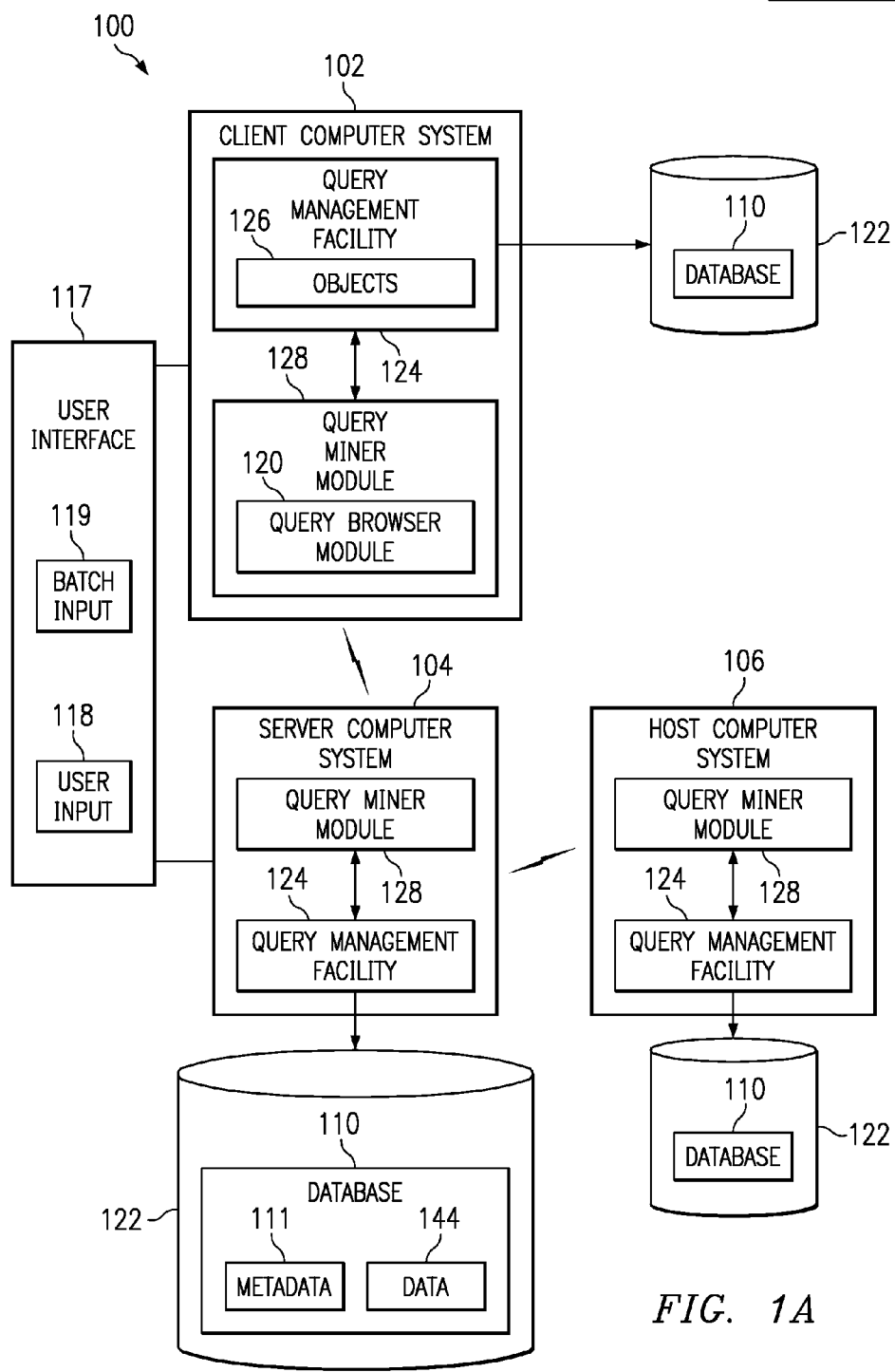
FIG. 1A is a block diagram that illustrates the computer systems that may implement the present invention.

As shown in the drawings and for purposes of illustration, the embodiment of the invention novelly determines how columns, tables, and queries, such as query objects, associated with a database are related to each other. Existing systems have not been able to provide users with a technique to efficiently determine the relationship between columns and tables of a database, and queries directed to a database. The present invention enables users to navigate quickly between different views of database information, such as query information. This is especially true when there are a large number of queries.

The present invention improves the analysis of metadata in a database that may contain database information aspects. For example, the query miner module may collect information on the frequency of combinations of table and column information associated with a query for use during the analysis of the metadata. The information generated by the query miner module advantageously enables a user to determine useful attributes, such as dimensions, from a database for OLAP processing. By means of further example the query miner module may provide information about heuristic rules that search for items such as: specific owners of database information, naming conventions, SQL statement data, the time the query was created or modified, or the last execution of the query.

Further, an embodiment of the present invention efficiently generates information about columns, tables, and queries associated with databases and enables a user to see at a glance which columns and tables are used in certain queries. The present invention may be implemented with a query miner module and a query browser module that improves browsing through queries and their components over the past. The preferred embodiment of the present invention provides an easy to use graphical interface showing the associated queries, tables, and columns in a tree structure. Further, the preferred embodiment of the present invention presents information about the relationship between columns, tables, and queries to the user without discernable lag time between the user's request and the generated information.

FIG. 1A is a block diagram that illustrates the computer systems that may operate with the present invention. As shown in FIG. 1A and in element 100, the preferred embodiment of the present invention may operate in a networked computer system configuration. Therefore, a client computer system 102 may communicate with a server computer system 104 during the operation of the present invention. Further, the server computer system 104 may operate in conjunction with the host computer system 106. The query miner module 128 and the query browser module 120 operate in the client 102, the server 104, or the host computer system 106 to perform the preferred embodiment of the present invention. For example, information may be communicated to either the server 104 or the client 102 via the user interface 117; and may subsequently be used by the query miner module 128 to determine useful attributes from a database 110, or by the query browser module 120 to efficiently determine how columns 152, tables 150, and queries of a database 110 are related to each other. The user interface 117 may communicate with the preferred embodiment of the present invention, either via batch input 119 or user input 118. Further, the database 110 may be configured in the memory 558 of the client 102, the server 104, or the host 106. Alternatively the database 110 may be configured in computer storage such as that of a disk 122. Elements 150 and 152 are described with reference to FIG. 1B, and element 558 is described with reference to FIG. 5.

According to the preferred embodiment of the present invention the query browser module 120 operates during the operation of the query miner module 128, and may operate in conjunction with the product marketed under the trademark IBM QMF 124 (Query Management Facility). QMF 124 is a toolset for querying, reporting, and updating data 144 stored in databases 110 and metadata 111 associated with databases 110. QMF 124 enables users to create, archive, and share queries and reports associated with data 144 and metadata 111. QMF 124 operates on objects 126 that may be associated with the query miner module 128, such as queries, tables 150, and forms that are used to generate reports. For example queries may be implemented as query objects 126 that may retrieve or modify data 144 in a database 110.

The preferred embodiment of the present invention employs the query miner module 128 to analyze query objects 126 and, tables 150 along with the associated columns 152. This analysis advantageously enables a user to determine useful attributes, such as dimensions 160, from a database 110 for OLAP processing. The preferred embodiment of the present invention controls query-related and report-related communication by isolating the user communication to the query miner module 128. More particularly, the query miner module 128 accepts communication from the user via the user interface 117. Further, the query miner module 128 and the QMF 124 may communicate in order to create query and browser commands that are communicated by the QMF 124 to the database 110. Element 160 is described with reference to FIG. 1B.

According to the present embodiment of the invention the query browser module 120 that operates in conjunction with the query miner module 128 is used to present table 150, column 152, and query information. The present invention allows easy browsing of query objects 126, tables 150, and columns 152, and enables a user to see at a glance in which query object 126 certain columns 152 and tables 150 are used.

FIG. 1B is a block diagram that illustrates a view 160, such as query view_A 154. Data 144 in a relational database 110 may be organized into logical arrangements, such that various attributes comprise a record 158, or row, in a table 150, such as the query view_A 154, and each attribute instance is stored in a column 152 of the table 150 in that row for the record 158. In the present example, query view_A 154 includes the following columns 152: Deptname 161, Location 162, Manager 164, Deptnumb 166, and Division 168. Further, query view_B 156 includes another view 160 of the data 144 in the following columns 152: Deptname 161, Manager 164, and Division 166.

It will be appreciated that a dimension 160 may be two-dimensional, and therefore may be described as a table 150 having rows 158, such as records, and columns 152. The preferred embodiment of the present invention accesses the name of the table 150 and the name of the columns 152 within a table 150. According to one embodiment of the present invention, this information is mapped from a particular query object 126 to a user-specific report 230 in order to provide information about queries, tables 150, and columns 152 to the user. Element 230 is described with reference to FIG. 2A.

Figure 2A:
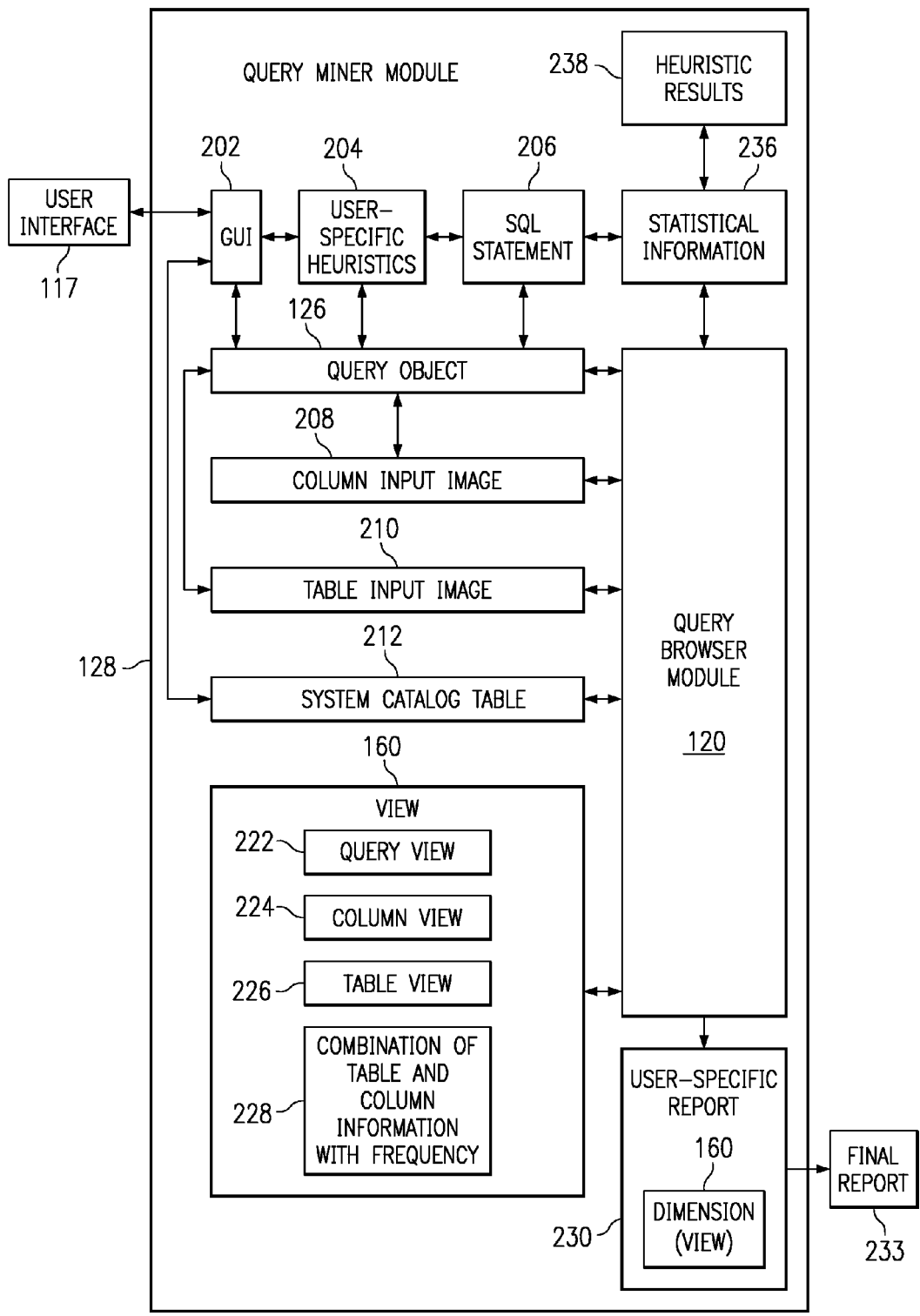
FIG. 2A is a block diagram that illustrates the query miner module.

FIG. 2A illustrates the operation of the query miner module 128. The query miner module 128 allows users to save SQL statements 206 as query objects 126 that may be used to direct analysis of a database 110. The query object 126 represents the information about the association between columns 152, tables 150 and queries, such as query objects 126, of a database 110 that is derived via an SQL statement 206. In the preferred embodiment of the present invention, the query miner module 128 includes a graphical user interface (GUI) 202 that enables input from the user interface 117 to be used by the query miner module 128. Information about user-specific heuristics 204 may be obtained via the GUI 202. The preferred embodiment of the present invention employs the query miner module 128 to analyze query objects 126 based on user-specific heuristics 204 that are embodied in SQL statements 206. The SQL statement 206 is parsed by the query miner module 128 to determine the tables 150 that each query uses. The information from the system catalog table 212 is used to determine the columns 152 associated with each table 150. Elements 110, 150, and 152 are defined with reference to FIG. 1.

By means of example, the query miner module 128 may identify and rate query objects 126 according to their level of compliance with heuristic rules 204, and show heuristic results 238 related to information associated with the operation of query objects 126, such as statistical information 236. Further, the results of searches driven by heuristic rules 204 may be sorted in a variety of ways that may be used to analyze information about tables 150 and columns 152, and to generate additional user-specific heuristics 204. In one embodiment of the present invention information included in the query object 126 along with information from the system catalog table 212 may be formatted for use by the GUI 202 and for presentation to the user.

Also, the information included in the query object 126 may be formatted by use of the query browser module 120. The preferred embodiment of the present invention identifies at least one column input image 208, table input image 210, and query object 126. Information needed for presenting views 160 is retrieved from the column input image 208, the table input image 210, and the system catalog tables 212 that include column 152 information about each table 150 and are used to derive query object 126 information. The table input image 210 includes the query objects 126 that reference the table 150 and the columns 152 associated with the table 150. The column input image 208 includes the query objects 126 that use the column 152 and the tables 150 that are used in the query objects 126.

When a query object 126 is executed via the query miner module 128, the SQL statement 206 is used against the database 110 to retrieve metadata 111 about the query object 126. The result of the metadata retrieval may be presented in a variety of views 160 that contain information associated with a database table 150 and that format the information by use of the columns 152 of the database 110. The result of executing a query object 126 generating the associated views 160 may be presented to the user as a user-specific report 230. Element 111 is described with reference to FIG. 1A.

More particularly and according to the one embodiment of the present invention, the query browser module 120 transforms information from the query object 126, the column input image 208, and the table input image 210, into views 160. The views 160 include the query view 222, the column view 224, and the table view 226. The views 160 are described in detail with reference to FIG. 3. The preferred embodiment of the present invention is implemented so that different views 160 may be presented with a simple user action and so that users can navigate quickly between the different views 160. One embodiment of the present invention presents a query view 222, a column view 224, and a table view 226 thereby showing how queries, columns 152, and tables 150 are related to each other. Further, the views 160 associated with the preferred embodiment of the present invention are related to the query object 126 that includes information derived from SQL statements 206, and to the column input image 208, and the table input image 210.

In an alternative embodiment of the present invention, a view 160 may be presented that includes information about the frequency of combinations of table and column occurrences 228 and may be represented as a statistical tabulation 236 in user-specific reports 230. The table combinations 228 represent the number of query objects 126 that contain two or more tables 150. Therefore, by means of example and as shown in Table 1, there were nineteen query objects 126 that contained both tables 150: Q.STAFF and Q.ORG.

TABLE 1

Table Combinations

| TABLE NAME | TABLE NAME | NUMBER OF QUERY OBJECTS CONTAINING BOTH TABLES |
|---|---|---|
| Q.STAFF | Q.ORG | 19 |
| Q.STAFF | Q.DEPT | 5 |
| Q.SALES | Q.LOCATION | 1 |

The column combinations 228 represent the number of query objects 126 that contain two or more columns 150. Therefore, by means of example and as shown in Table 2, there were ten query objects 126 that contained both columns 152: Q.STAFF.ID and Q.STAFF.SALARY.

TABLE 2

Column Combinations

| TABLE NAME | TABLE NAME | NUMBER OF QUERY OBJECTS CONTAINING BOTH TABLES |
|---|---|---|
| Q.STAFF.ID | Q.STAFF.SALARY | 10 |
| Q.STAFF.CUSTNO | Q.STAFF.ID | 5 |
| Q.SALES.QUANTITY | Q.STAFF.YEARS | 1 |

The query browser module 120 generates a user-specific report 230 that enables the presentation of metadata 111. For instance, a user may initiate commands that display text, such as the user-specific report 230, on a computer monitor, such as a display 515. The user-specific report 230 is a structure that efficiently describes the elements of a database 110, such as the definitions of the dimensions 160 of the database 110 and the members of the database 110. In the preferred embodiment of the present invention, a user may drag and drop icons that represent query objects 126, tables 150, and columns 152 of a database 110 into the user-specific report 230, thereby indicating that particular dimensions 160 are included in the database 110 structure defined by the user-specific report 230. In the preferred embodiment of the present invention, the user-specific report 230 is a tree structure containing dimensions 160, such as table 150 and column 152 references. Element 515 is described with reference to FIG. 5.

User-specific reports 230 may be further transformed by use of the query browser module 120 into final reports 233, such as those in an extensible markup language (XML) format. Those skilled in the art will appreciate the use of reports in XML format.

Figure 2B:
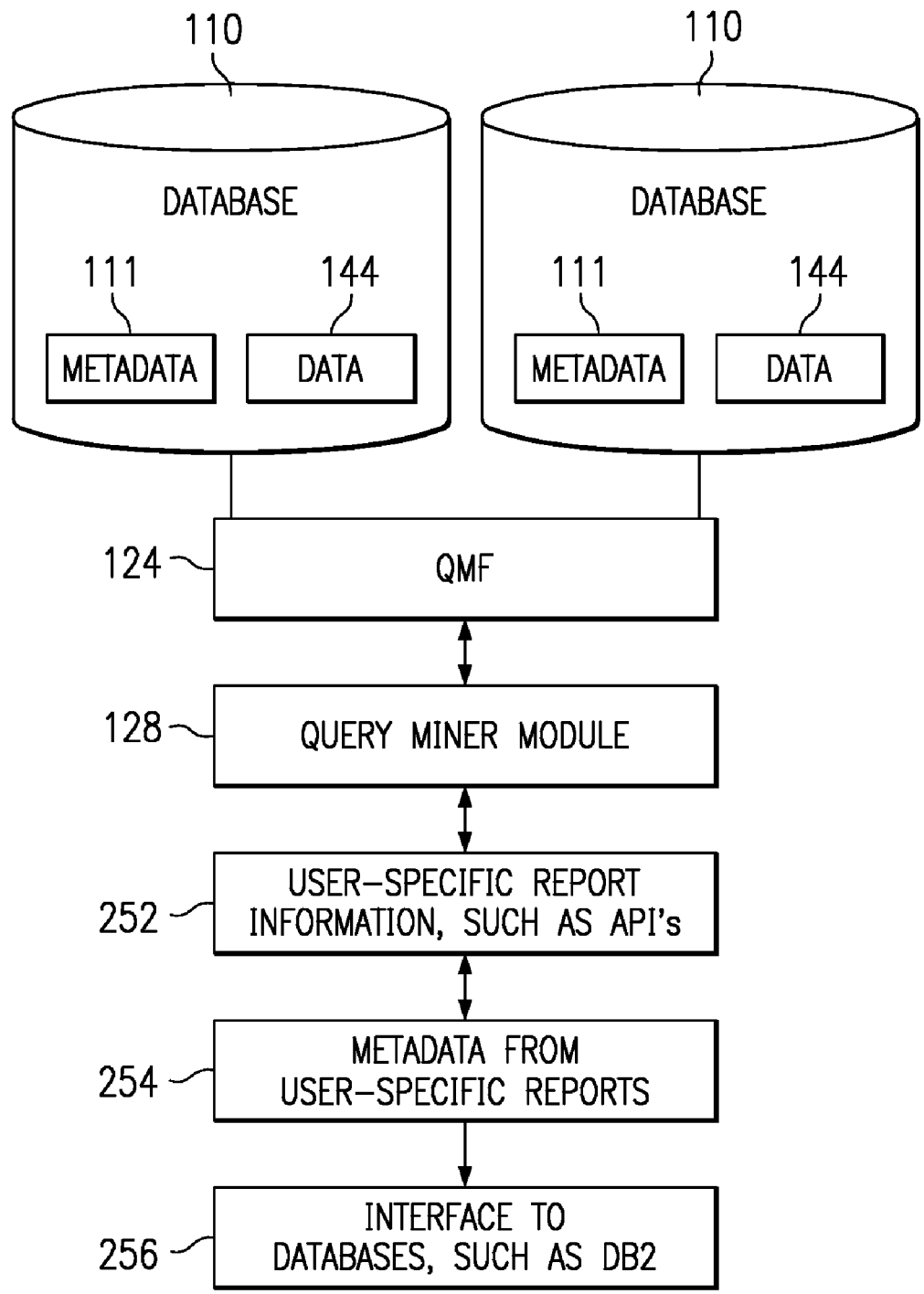
FIG. 2B is a block diagram that illustrates the query miner module that interfaces with databases.

FIG. 2B illustrates the operation of the Query Miner module 128 that interfaces with databases 110. Data 144 that may be used in databases 110 is combined from a variety of data sources. Data 144 and metadata 111 may be accessed optionally by QMF 124. The query miner module 128 may obtain information about the data 144 and the metadata 111 typically via QMF 124. As shown in element 252, the query miner module 128 obtains information for use with the user-specific reports 230, such as application programming interface (API)

information. Further, the information used with the user-specific report 230 may be manipulated by a computer system 500 that is described in detail with respect to FIG. 5. As shown in element 254, the computer system 500 may generate metadata 111 from the user-specific reports 230. For instance, information about the data 144, its location and size, and information about the tables 150 and columns 152 may be generated. Further and as shown in element 256, the metadata 111 may communicate with databases 110 via interfaces, such as QMF 124. Element 230 is described with reference to FIG. 2A.

Figure 3A:
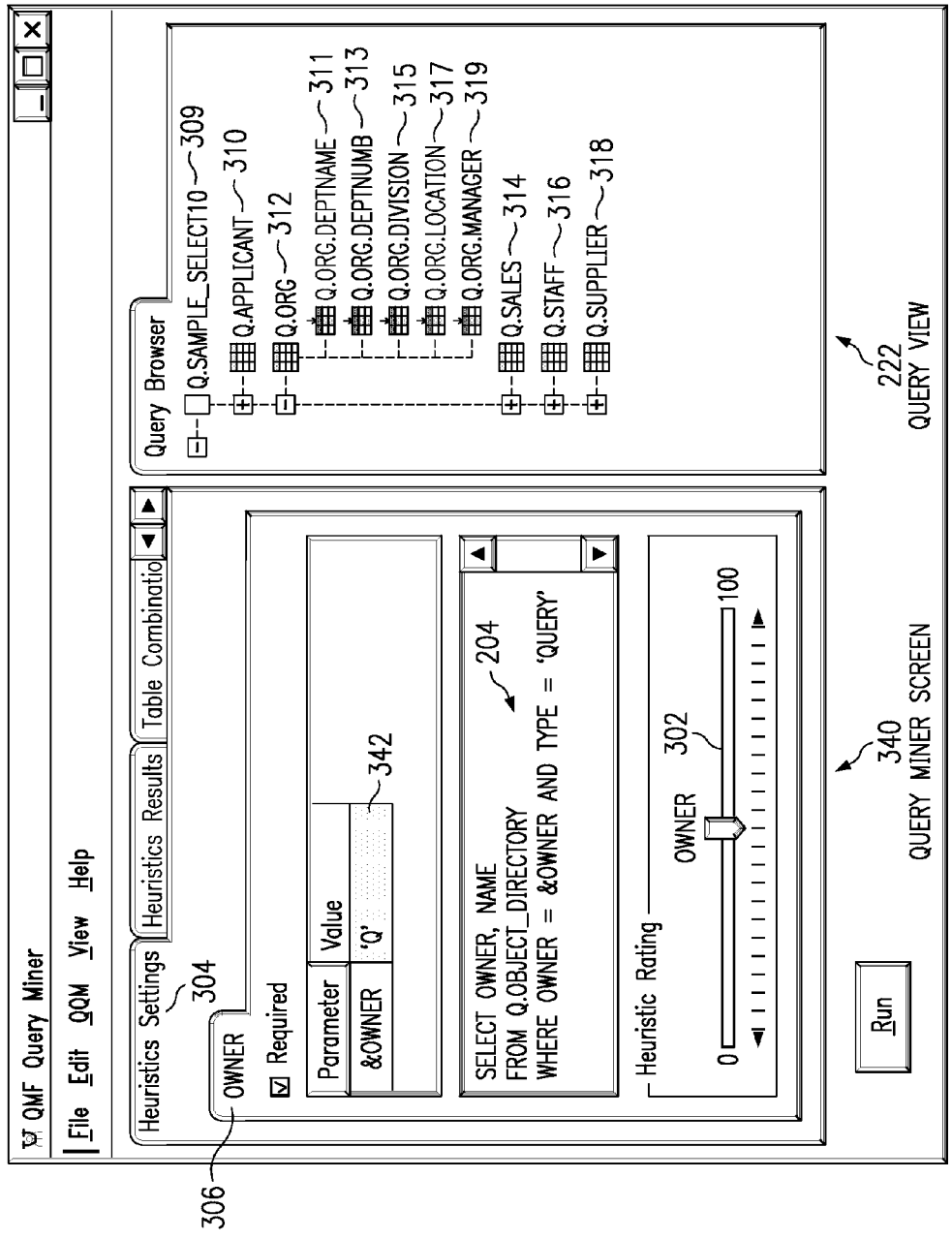
FIG. 3A is a block diagram that illustrates heuristics.
Figure 3:
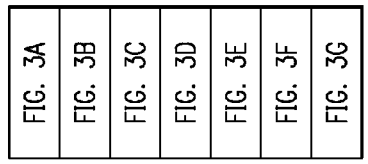
FIG. 3 includes FIG. 3A, FIG. 3B, FIG. 3C, FIG. 3D, FIG. 3E, FIG. 3F, and FIG. 3G.

FIG. 3 illustrates an implementation of the query miner module 128 and the query browser module 120. As shown in FIG. 3A heuristics 204 are used by the preferred embodiment of the present invention to query the database 110 according to rules set up by a user. By means of example and as shown in the query miner screen 340, the heuristics settings 304 may be defined by identifying an owner 306 of a query object 126. In the present example the heuristics rule, as shown in element 204, selects an owner 306 from the Q.OBJECT_DIRECTORY. Heuristic ratings 302 determine the ratio of influence of each heuristic rule 204 during the operation of the query miner module 120. A user may choose a particular heuristic rule 204 from a list of heuristic rules 204 associated with a named schema 342 of a database 110, and the user may set the heuristic rating 302 on a per-heuristic basis. The total of the heuristic ratings 302 associated with an instance of execution of the query miner module 120 will equal one hundred percent. Elements 110 and 120 are described with reference to FIG. 1.

A schema 342 is a named collection of objects such as tables 150 and views 160. For example a schema 342 named "Q" as shown in the query miner screen 340 may contain a table 150 named APPLICANT 310. The schema 342 named "Q" may also contain a table 150 named STAFF 316. The name STAFF may be referred to by a qualified name that includes the appropriate name for the schema 342, such as Q.STAFF 316, as shown in the query view 222. The name of the schema 342 may identify the owner of a user-specific report 230 and information, such as the level of access to information in a database 110, may be inferred by the name of the schema 342. Elements 150 and 160 are defined with reference to FIG. 1, and element 230 is described with reference to FIG. 2A.

In one embodiment of the present invention, the results of the operation of the query browser module 120 are displayed in a tree form. Therefore, as shown in the present example and in the query view 222, the query object Q.SAMPLE_SELECT10, as shown in element 309, includes the following tables 150: Q.APPLICANT 310, Q.ORG 312, Q.SALES 314, Q.STAFF 316, and Q.SUPPLIER 318. The columns 152 included in each table 150 are identified and displayed in tree form. Therefore in the present example, the Q.ORG Table 312 includes the following columns: Q.ORG.DEPTNAME 311, Q.ORG.DEPTNUMB 313, Q.ORG.DIVISION 315, Q.ORG.LOCATION 317, and Q.ORG.MANAGER 319. While the view 160 is presented herein as a tree structure representing the information, it will be appreciated that other formats may be used to represent the identified information without departing from the spirit of the invention.

Figure 3B:
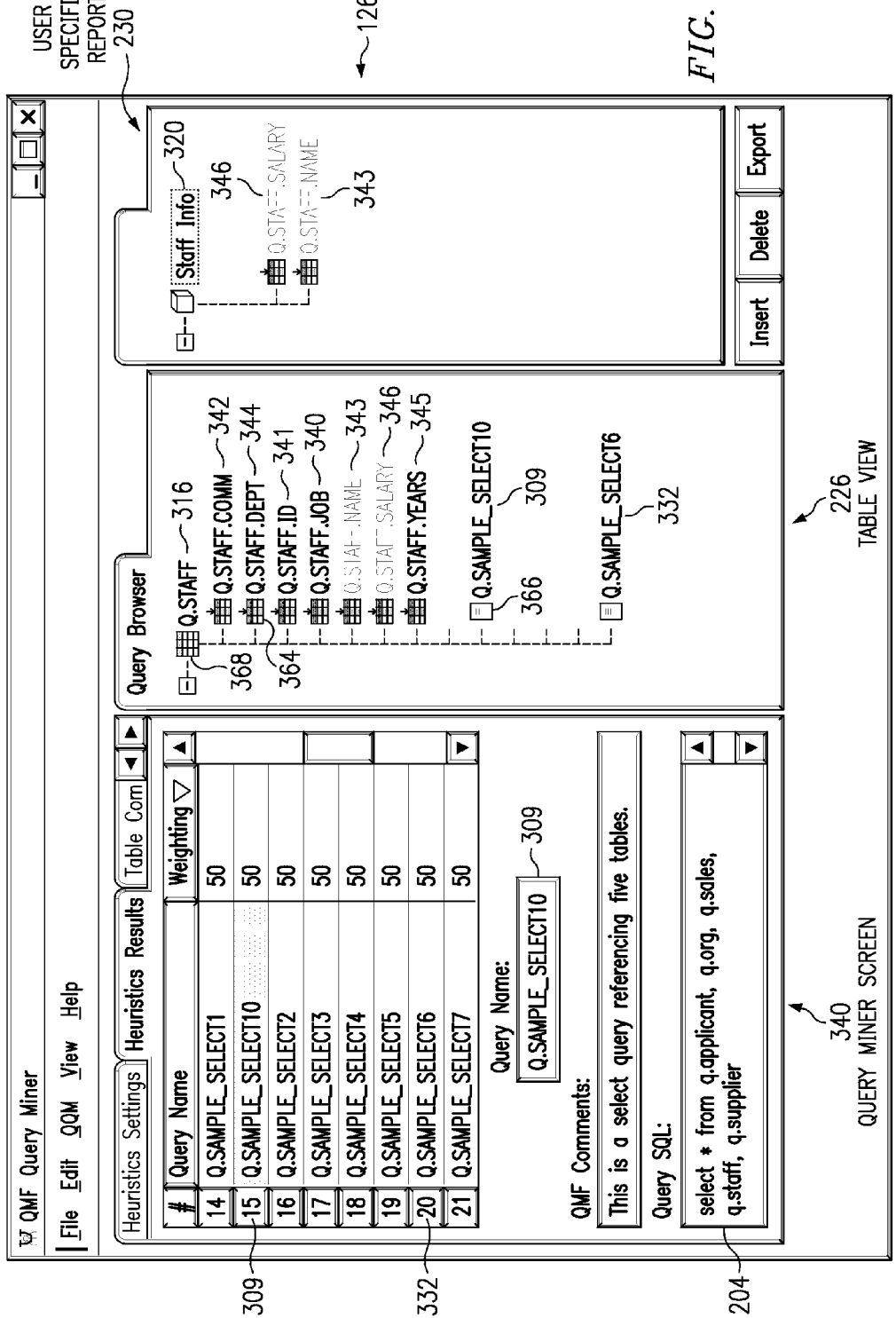
FIG. 3B is a block diagram that illustrates the table view.

As shown in FIG. 3B, the table view 226 presents information about the columns 152 in the table 150 and the query objects 126 that use the table 150. The table view 226 information is based on table input image information 210 and information from the system catalog tables 212. The table input image information 210 is used to determine the query objects 126 that use the table 150. The system catalog tables 212 are used to determine the columns 152 associated with each table 150. Elements 126, 150, and 152 are described with reference to FIG. 1, and elements 210 and 212 are described with reference to FIG. 2.

Further, a variety of query objects 126 may be identified. For example and as shown in the query miner screen 340, the query objects Q.SAMPLE_SELECT6, as shown in element 332, and Q.SAMPLE_SELECT10, as shown in element 309, are identified on the list of query objects 126. For each view 160, information about other aspects of the database 110 is shown. For instance after the execution of a query object 126 via the query miner module 128, the query object 126 may be highlighted by the user and dragged to a view 160 screen, such as the table view 226, that may operate via the query browser module 120. In the present example, the query miner module 128 expands the information associated with the table 150, Q.STAFF 316 via the query browser module 120. More particularly, the table view 226 is displayed that includes the columns 152 associated with Q.STAFF 316. In the present example, the columns 152 associated with the Q.STAFF table 316 are: Q.STAFF.COMM 342, Q.STAFF.DEPT 344, Q.STAFF.SALARY 346, Q.STAFF.ID 341, Q.STAFF.JOB 340, Q.STAFF.NAME 343, and Q.STAFF.YEARS 345. Also, the query objects 126 that access the table Q.STAFF 316 include: Q.SAMPLE_SELECT10 309 and Q.SAMPLE_SELECT6 332. In the present example, the query object 126, Q.SAMPLE_SELECT10, as shown in element 309, is associated with the heuristic rules that are described as shown in element 204. Elements 120, 128, and 160 are described with reference to FIG. 1.

FIG. 3B also illustrates the table view 226. In the present example the user-specific report 230 was generated from information in the table view 226. The user may choose a particular column 152 or query object 126. For instance, the user may highlight the column icon 364 and drag it to the user-specific report 230 via the query browser module 120. The query browser module 120 accesses information via the query miner module 128 that may then be presented to the user on the user-specific report 230. The preferred embodiment of the present invention also uses table icons 368 to represent tables 150 and query icons 366 to represent query objects 126.

A view 160, or dimension, may be uniquely represented in the user-specific report 230. For example, the STAFF INFO dimension 320, is represented in the user-specific report 230 and is a user-defined dimension 160 that includes information from the Q.STAFF table 316 including columns: Q.STAFF.NAME 343 and Q.STAFF.SALARY 346. Further, as shown in one embodiment of the present invention, additional information about the relationship between the queries, columns 152, and tables 150 associated with a database 110 is presented by using different font displays, such as boldface or gray-face fonts. Therefore, those columns 152 that are in a table 150 that is accessed by the query object 126, here Q.SAMPLE_SELECT10, as shown in element 309, and that are also shown in the user-specific report 230, here included in the STAFF INFO dimension 320, are shown in gray-face font. More particularly, Q.STAFF.SALARY 346 and Q.STAFF.NAME 343 are shown in the table view 226 in gray-face font.

Figure 3C:
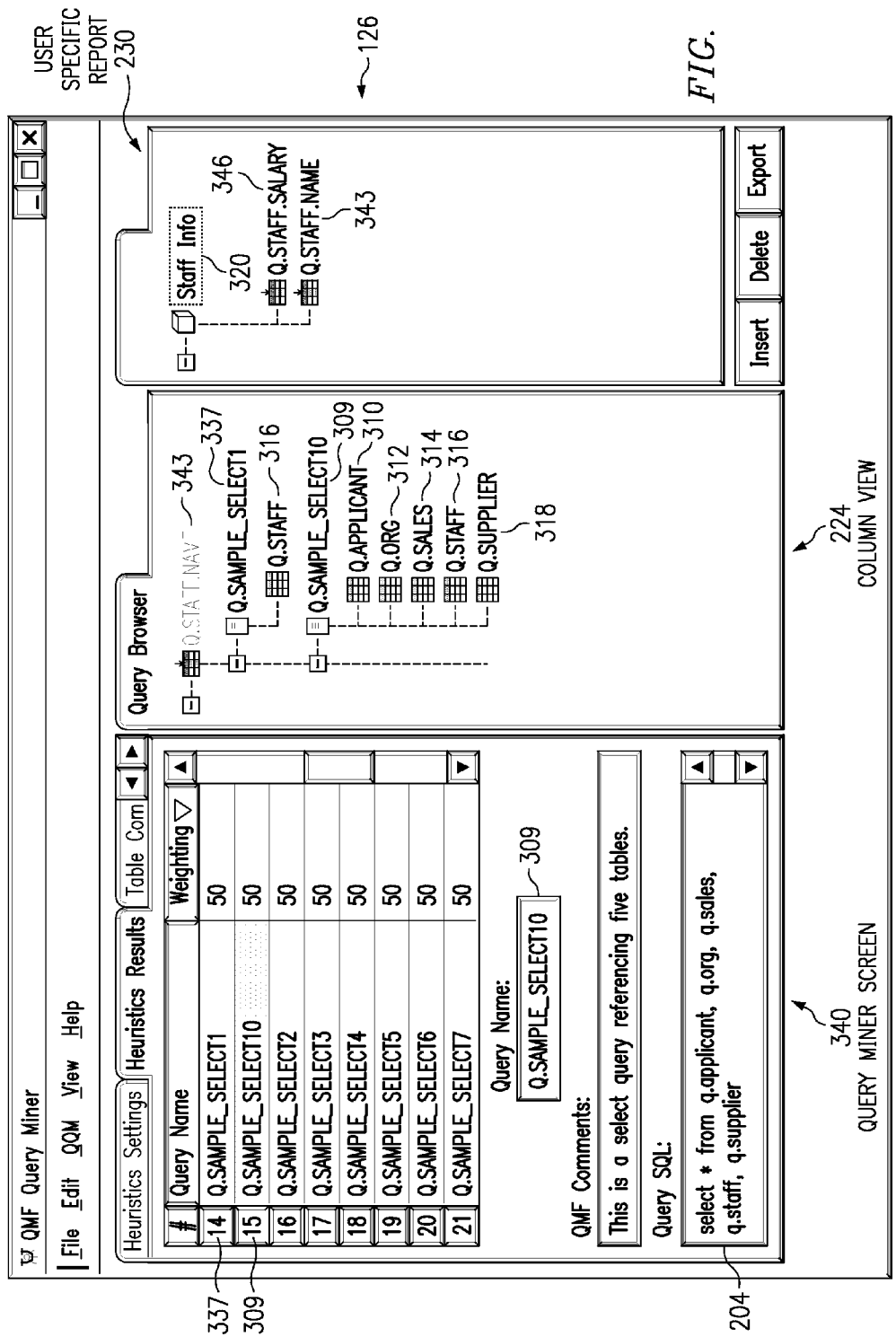
FIG. 3C is a block diagram that illustrates the column view.

As shown in FIG. 3C, the column view 224 presents information about the query objects 126 that use that column 152 as well as the tables 150 used in each of the associated query objects 126. The column input image information 208 is used to determine the query objects 126 that reference the column 152. The table input image information 210 is used to determine the query objects 126 that reference the table 150.

Elements 150 and 152 are described with reference to FIG. 1, and elements 208 and 210 are described with reference to FIG. 2.

The column view 224 includes information about the query objects 126 that reference the column 152. In the present example the following query objects 126 reference Q.STAFF.NAME 346: Q.SAMPLE_SELECT1, as shown in element 337, and Q.SAMPLE_SELECT10, as shown in element 309. The tables that are referenced by each query object 126, here Q.SAMPLE_SELECT1 337 and Q.SAMPLE_SELECT10 309, are also included in the column view 224. For example, the following tables 150 are referenced by Q.SAMPLE_SELECT10 309: Q.APPLICANT 310, Q.ORG 312, Q.SALES 314, Q.STAFF 316, and Q.SUPPLIER 318.

The user-specific report 230 is also shown in FIG. 3C. Here, the specific dimension, STAFF INFO 320, includes the following columns 152: Q.STAFF.SALARY 346 and Q.STAFF.NAME 343. According to an alternative embodiment of the present invention and since Q.STAFF.NAME 343 is referenced in the user-specific report 230, it is also displayed in gray-face type in the column view 224. Also as shown in the query miner screen 340, the heuristic rules description of the query object 126 is described with reference to element 204.

Figure 3D:
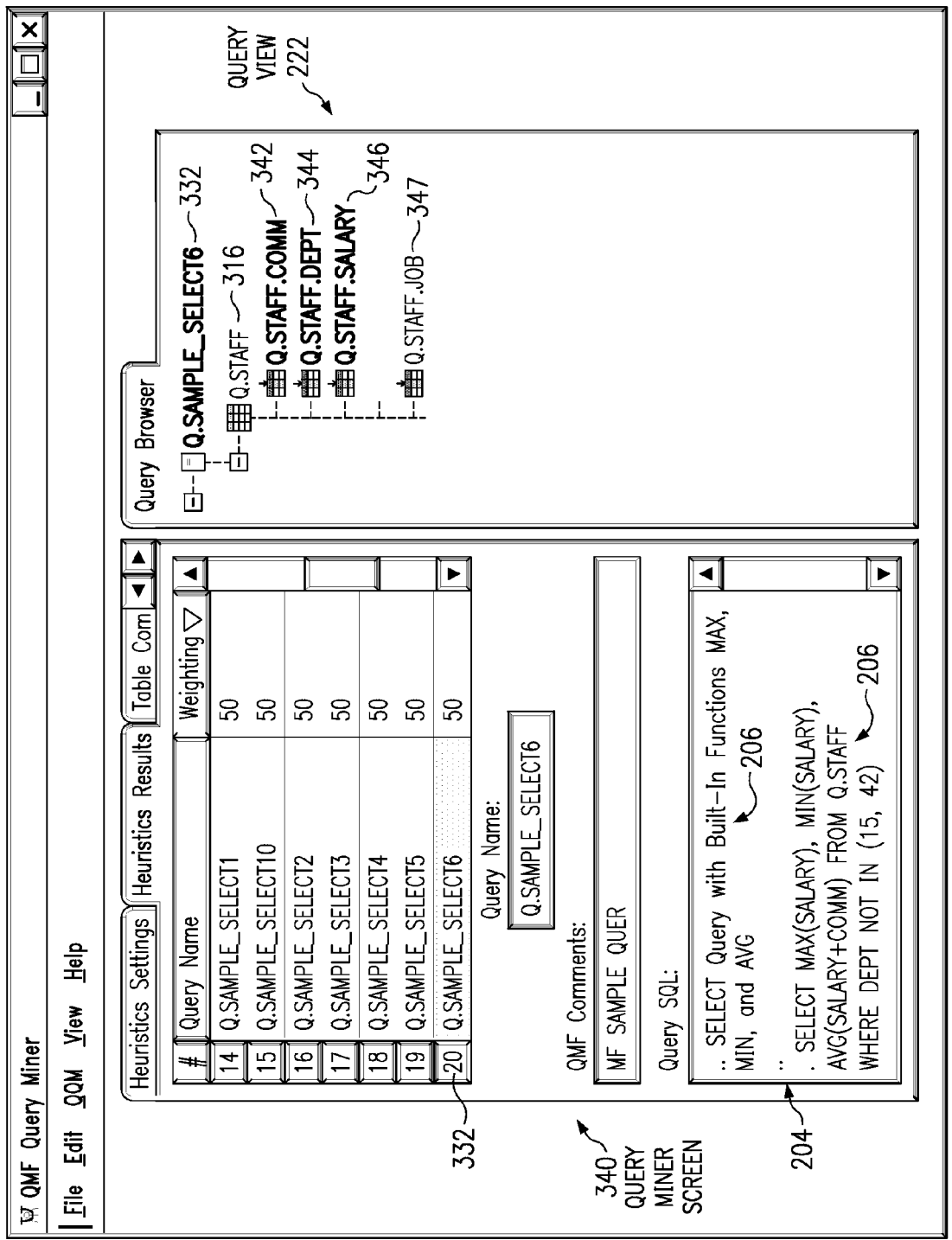
FIG. 3D is a block diagram that illustrates the query view.

According to the preferred embodiment of the present invention, there are at least three views 160: the query view 222, the column view 224, and the table view 226. As shown in FIG. 3D, the query view 222 presents information about the columns 152 and tables 150 that are used in that query object 126. Information from the query view 222 is based on heuristic rules 204 that are used by the query object 126 and are derived from an actual SQL statement 206 and information from the system catalog table 212. Elements 150, 152, and 160 are described with reference to FIG. 1, and elements 212, 224, and 226 are described with reference to FIG. 2.

Users can switch between views 160 easily and in one embodiment of the present invention may switch by pressing the right mouse button over a highlighted item. For example, if the user is viewing the column view 224 and right clicks on "Q.SAMPLE._SELECT6," a switch to the query view 222 with Q.SAMPLE_SELECT6 as the root of the tree, as shown in element 332, will occur. Those skilled in the art will appreciate that user preference may be transmitted by use of the right mouse button.

In an alternative embodiment of the present invention, the columns 152 that were referenced in the identified query object 126, here Q.SAMPLE_SELECT6 332, are presented in boldface font in the query view 222. Columns 152 with no special coloring indicate that the column 152 is in the table 150 but is not being used in the query object 126. One such example of a column 152 represented by no special coloring is Q.STAFF.JOB 340. In the preferred embodiment of the present invention, the columns 152 that are used in the operation of that query object 126 are displayed first and are represented in boldface font, including: Q.STAFF.COMM 342, Q.STAFF.DEPT 344, and Q.STAFF.SALARY 346.

Figure 3E:
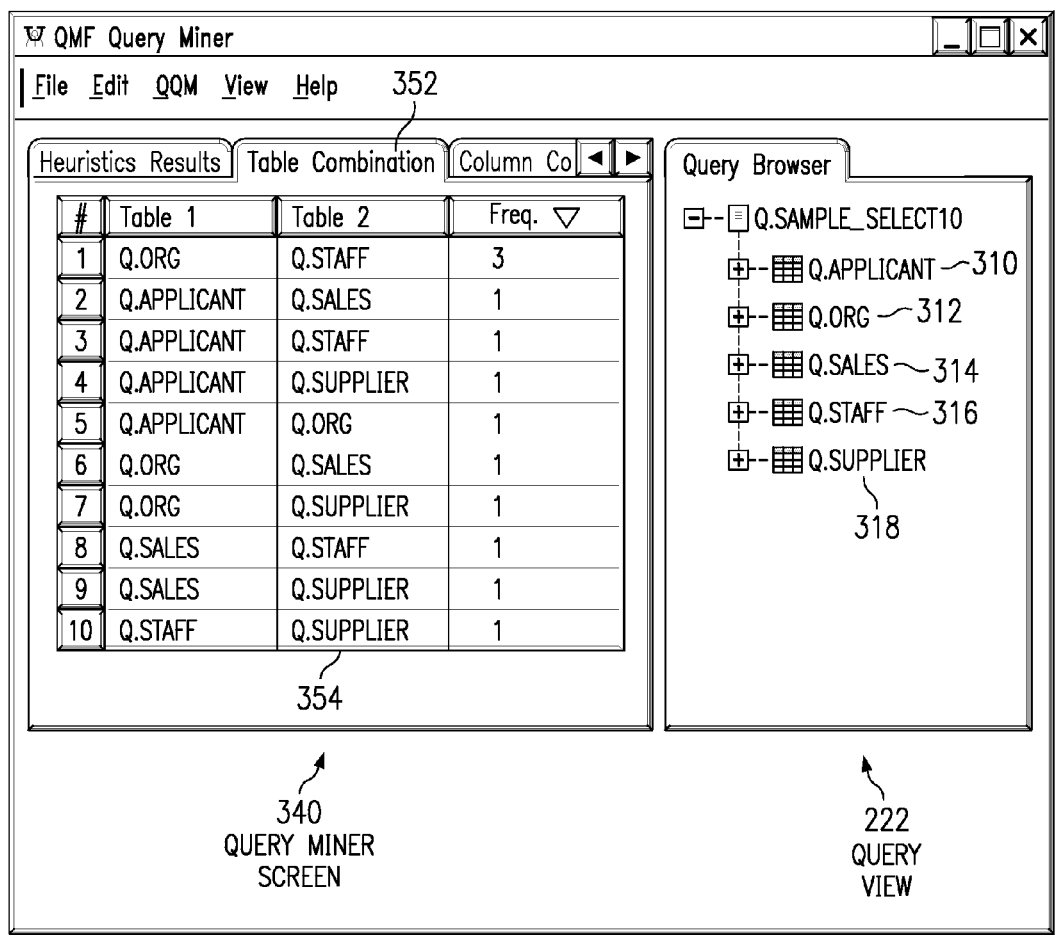
FIG. 3E is a block diagram that illustrates pairs of table identifiers.

In one embodiment of the present invention, the query miner module 128 may collect information on the frequency of combinations of tables and columns 228 associated with query objects 126 so that the user may assess the relative association of the tables 150 and columns 152. FIG. 3E illustrates the table combination identifier 352 of the query miner screen 340. Therefore, pairs of table identifiers 354 are displayed along with the frequency with which the pair is referenced by query objects 126. Therefore, the tables 150 included in the pairs of table identifiers 354 are included in the query view 222 along with the columns 152 in each table 150.

In the present example the following tables 150 are represented: Q.APPLICANT 310, Q.ORG 312, Q.SALES 314, Q.STAFF 316, and Q.SUPPLIER 318. Elements 126, 150, and 152 are described with reference to FIG. 1, and element 228 is described with reference to FIG. 2.

Figure 3F:
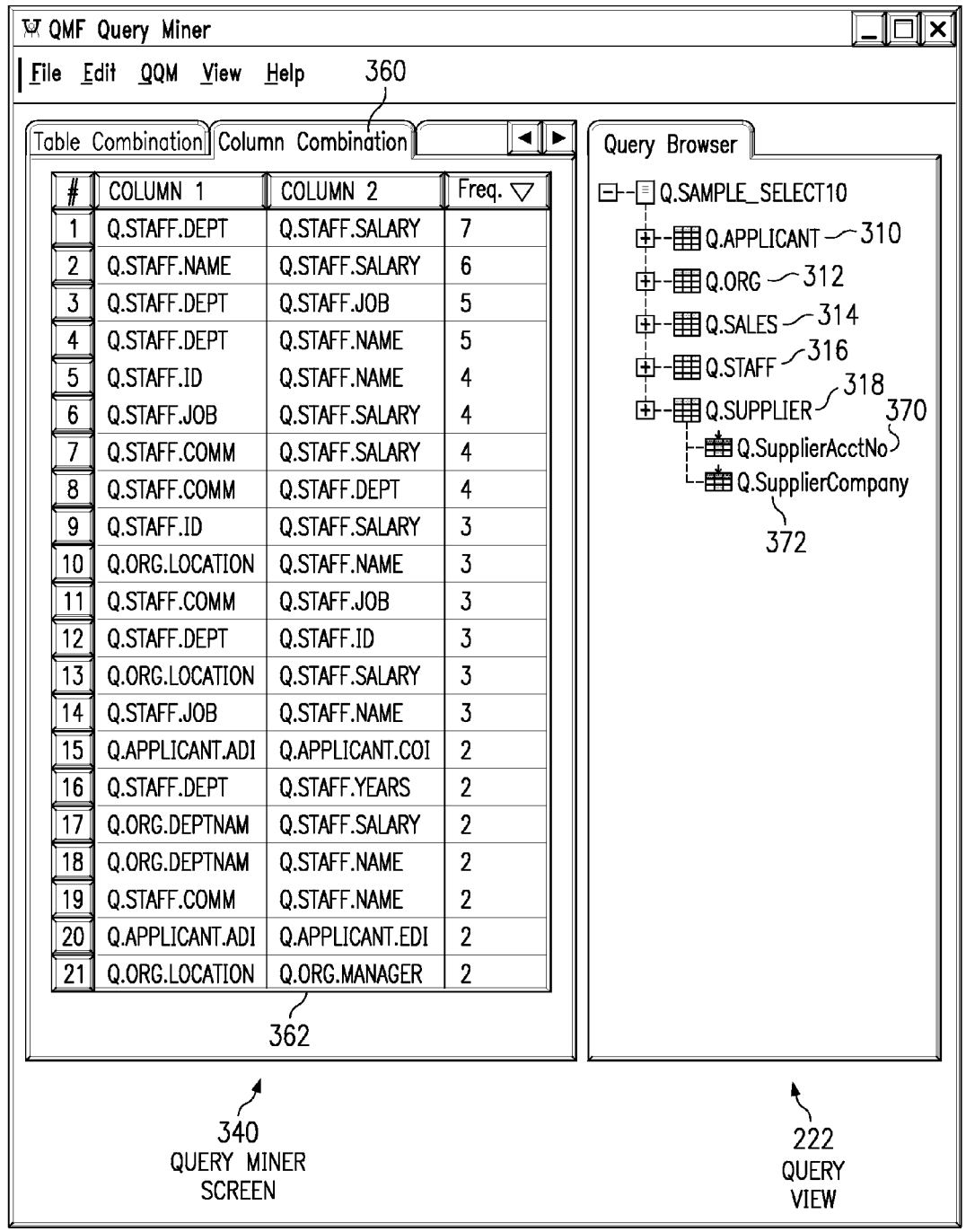
FIG. 3F is a block diagram that illustrates pairs of column identifiers.

FIG. 3F illustrates the column combination identifier 360 of the query miner screen 340. Therefore, pairs of column identifiers 362 are displayed along with the frequency with which the pair is referenced by query objects 126. Therefore, the columns 152 included in the pairs of column identifiers 362 are included in the query view 222 along with the tables 150 in which the columns 152 reside. The tables 150 include: Q.APPLICANT 310, Q.ORG 312, Q.SALES 314, Q.STAFF 316, and Q.SUPPLIER 318. The columns 152 included in the table Q.SUPPLIER 318 are: Q.SUPPLIER.ACCTNO 370 and Q.SUPPLIER.COMPANY 372.

FIG. 3G illustrates the final report 233 that is generated by the query browser module 120, and that includes the information from the user-specific report 230. In the preferred embodiment of the present invention the final report 233 is formatted as an extensible mark-up language (XML) file. Those skilled in the art will appreciate the use of XML files. The final report 233 may be presented to the user in a variety of formats. In the preferred embodiment of the present invention the final report 233 is displayed on a computer monitor, such as a display 515, or is printed. The final report 233 may contain information about the metadata 111. Element 120 is described with reference to FIG. 1, element 230 is described with reference to FIG. 2, and element 515 is described with reference to FIG. 5.

The present invention improves the analysis of metadata 111 in a database 110. The information generated by the query miner module 128 advantageously enables a user to determine useful relationships and attributes, such as dimensions 160, from a database 110, typically non-multidimensional, for OLAP processing. Elements 110 and 128 are described with reference to FIG. 1.

Figure 4:
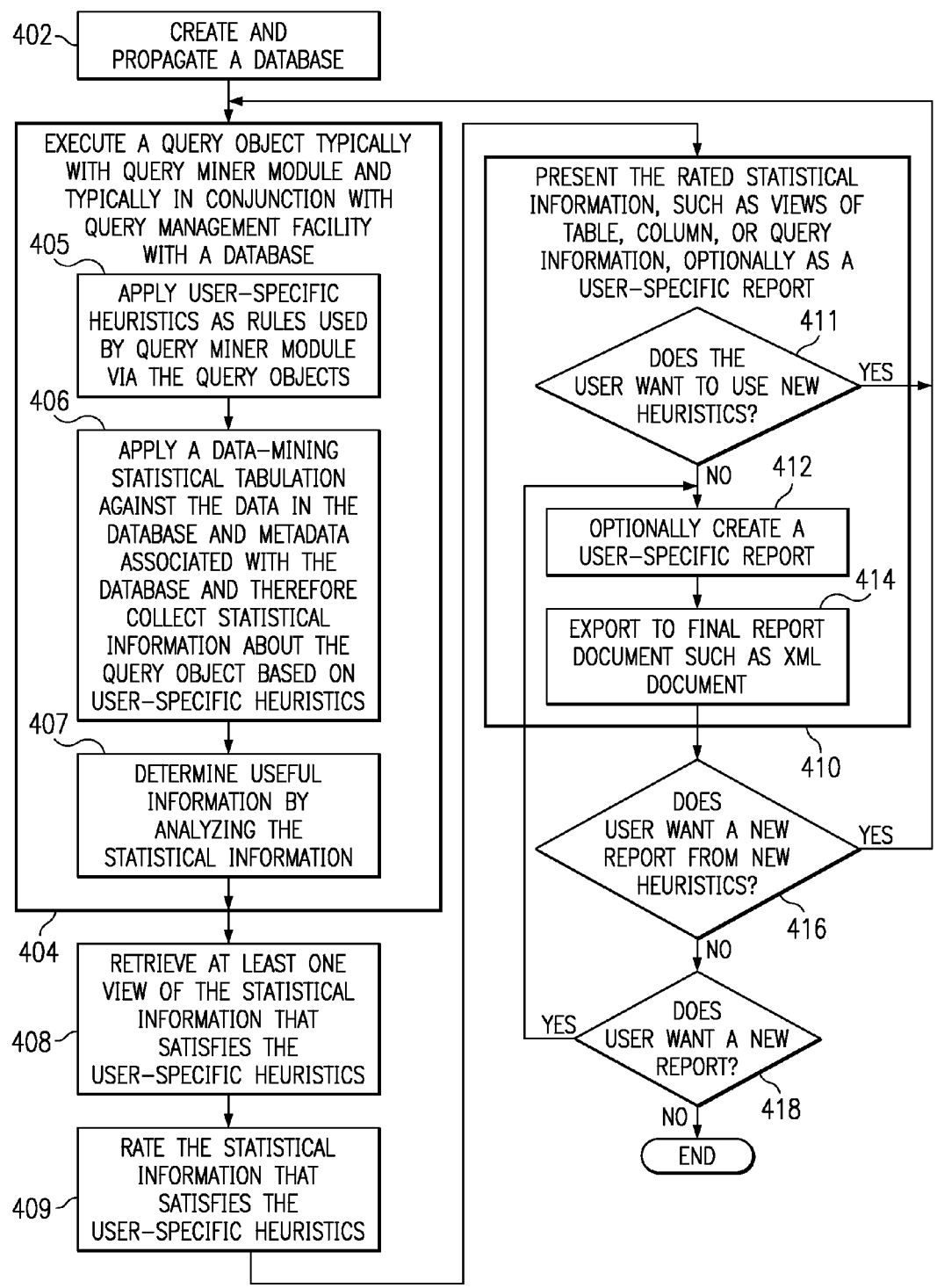
FIG. 4 is a flow diagram that illustrates the present invention.

FIG. 4 is a flow diagram that illustrates the present invention. Initially, as shown in element 402 a database 110 is created and propagated with data 144. Then, as shown in element 404, a query object 126 is executed by the operation of the query miner module 120 against the database 110 and typically operates in conjunction with the QMF 124. More particularly, as shown in element 405, this execution further includes applying user-specific heuristic rules 204 used by the query miner module 120 via the query objects 126. Heuristics are user-specific criteria that are defined herein as a set of rules intended to increase the probability of solving a problem associated with analysis of data 144. The preferred embodiment of the present invention employs a query miner module 128 to analyze query objects 126 based on user-specific heuristic rules 204 that are embodied in SQL statements 206. Also, the query miner module 128 applies datamining statistical information 236 against the query objects 126, as shown in element 406. By means of example, this enables the query miner module 128 to collect information on the frequency of combinations of table and column information 228 associated with a query object 126. As shown in element 407, the user may, by the operation of the query miner module 128, determine useful information by analyzing the statistical information 236. Elements 110, 124, 126, 128, 144, and 160 are described with reference to FIG. 1, and elements 204, 206, 228, and 236 are described with reference to FIG. 2.

In one embodiment of the present invention and as shown in element 408, the query browser module 120 may retrieve at least one view 160 of the statistical information 236 that satisfies the user-specific heuristic rules 204. Further, as shown in element 409, query objects 126 that satisfy the requirements of the heuristic rules 204 may be identified and rated. As shown in element 410 the query browser module 120 presents the rated statistical information 236, such as views 160 of tables 150, columns 152, or information about query objects 126. More particularly and as shown in element 411 the user may indicate whether new heuristic rules 204 should be applied. If the result of the test of element 411 is true, the operation of the present invention returns to element 404. Otherwise as shown in element 412, a user-specific report 230 may be created. The user-specific report 230 may be formatted to enhance the presentation of the statistical information 236. As shown in element 414, a final report document 233 such as an XML document may be exported so that the user can reference the final report 233. Elements 120, 150, and 152 are described with reference to FIG. 1, and elements 230 and 233 are described with reference to FIG. 2.

According to the preferred embodiment of the present invention information about the tables 150 and the columns 152 is complete for accurate browsing. Therefore, data collection is typically performed against all query objects 126. The user may repeat the process in order to generate a new user-specific report 230 based on new heuristic rules 204. Therefore, as shown in element 416 a test is conducted to determine if the user wants to repeat the process. If so, the QMF 124 and query miner module 128 are both typically executed again, as shown in element 404. If the result of the test of element 416 is NO, then the method of the invention moves to element 418. Further, if the user requires a new user-specific report 230, it may be generated without repeating the process, as shown in element 418. If the result of the test of element 418 is negative then the process is complete.

Figure 5:
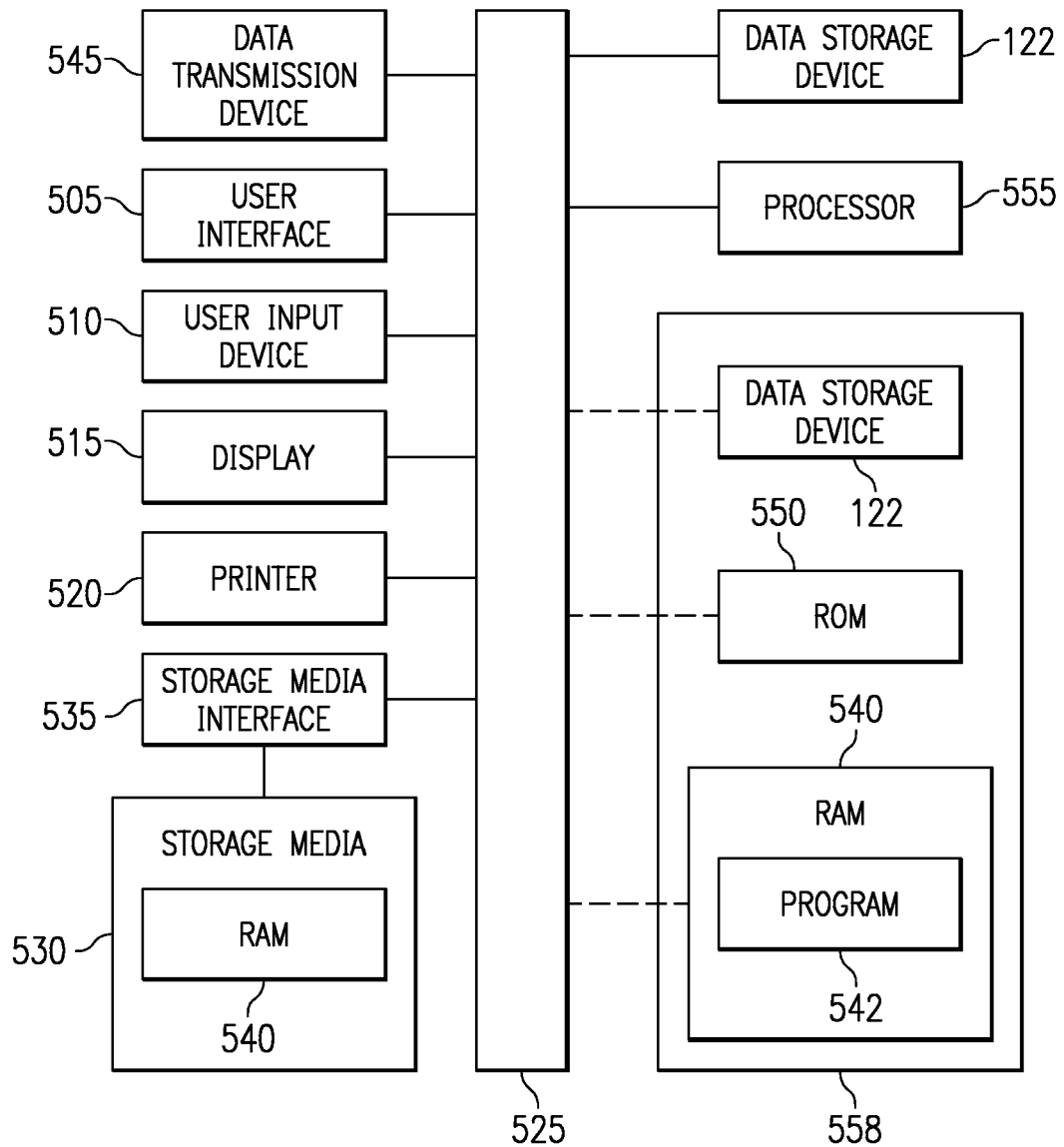
FIG. 5 is a block diagram of a computer system suitably configured for employment of the present invention.

FIG. 5 is a block diagram of a computer system 500, suitable for employment of the present invention. System 500 may be implemented on a general-purpose microcomputer, such as one of the members of the IBM Personal Computer family, or other conventional workstation or graphics computer device. In its preferred embodiment, system 500 includes a user interface 505, a user input device 510, a display 515, a printer 520, a processor 555, a read only memory (ROM) 550, a data storage device 122, such as a hard drive, a random access memory (RAM) 540, and a storage media interface 535, all of which are coupled to a bus 525 or other communication means for communicating information. Although system 500 is represented herein as a standalone system, it is not limited to such, but instead can be part of a networked system. The computer system 500 may be connected locally or remotely to fixed or removable data storage devices 122 and data transmission devices 545. For example, the server computer system 104, the client computer system 102, and the host computer system 106 also could be connected to other computer systems 500 via the data transmission devices 545. Elements 102, 104, and 106 are described with reference to FIG. 1.

The RAM 540, the data storage device 122 and the ROM 550, are memory components 558 that store data and instructions for controlling the operation of processor 555, which may be configured as a single processor or as a plurality of processors. The processor 555 executes a program 542 to perform the methods of the present invention, as described herein.

While the program 542 is indicated as loaded into the RAM 540, it may be configured on a storage media 530 for subsequent loading into the data storage device 122, the ROM 550, or the RAM 540 via an appropriate storage media interface 535. Storage media 530 can be any conventional storage media such as a magnetic tape, an optical storage media, a compact disk, or a floppy disk. Alternatively, storage media 530 can be a random access memory 540, or other type of electronic storage, located on a remote storage system.

Generally, the computer programs and operating systems are all tangibly embodied in a computer usable device or medium, such as the memory 558, the data storage device 122, or the data transmission devices 545, thereby making an article of manufacture, such as a computer program product, according to the invention. As such, the terms "computer program product" as used herein are intended to encompass a computer program accessible from any computer usable device or medium.

Moreover, the computer programs 542 and operating systems are comprised of instructions which, when read and executed by the server computer system 104, the client computer system 102, and the host computer system 106, cause the server computer system 104, the client computer system 102, and the host computer system 106 to perform the steps necessary to implement and use the present invention. Under control of the operating system, the computer programs 542 may be loaded from the memory 558, the data storage device 122, or the data transmission devices 545 into the memories 558 of the server computer system 104, the client computer system 102, and the host computer system 106 for use during actual operations. Those skilled in the art will recognize many modifications may be made to this configuration without departing from the scope of the present invention.

User interface 505 is an input device, such as a keyboard or speech recognition subsystem, for enabling a user to communicate information and command selections to the processor 555. The user can observe information generated by the system 500 via the display 515 or the printer 520. The user input device 510 is a device such as a mouse, track-ball, or joy stick that allows the user to manipulate a cursor on the display 515 for communicating additional information and command selections to the processor 555.

When operating in accordance with one embodiment of the present invention, system 500 improves the determination of how columns 152, tables 150, and queries of a database 110 are related to each other so that users can navigate quickly between different views 160 of database 110 information. The processor 555 and the program 542 collectively operate as a module for fast and efficient determination of dimensional information associated with a database 110, and presentation of information about columns 152, tables 150, and queries of a database 110. It will be appreciated that the present invention offers many advantages over prior art techniques. Elements 110, 150, 152, and 160 are described with reference to FIG. 1.

The present invention is typically implemented using one or more computer programs, each of which executes under the control of an operating system and causes the server computer system 104, the client computer system 102, and the host computer system 106 to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications may be devised by those skilled in the art. However, these should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims Trademarks IBM, DB2, and QMF are trademarks of International Business Machines Corporation in the United States, other countries, or both.

We claim:

1. A computer system including a processor and a data storage device to generate a user-specific report, said computer system having a database having metadata, said computer system having said at least one query object directed to said database, comprising:

executing said query object against said database by user-specific heuristics being applied as rules to said metadata via said executing query object and applying a data-mining statistical tabulation against data in said database and said metadata and thereby collecting statistical information about said query object based on said user-specific heuristics, wherein the user-specific heuristics are embodied in Structured Query Language (SQL) statements;

retrieving at least one view of said statistical information that satisfies said user-specific heuristics, wherein said at least one view includes one of a table view, a column view, and a query view, wherein said table view presents information about columns in a table and query objects that use said table, wherein said column view that presents information about query objects that use a column and tables used in each of said query objects that use said column, and wherein the query view presents information about columns and tables that are used in said query object;

rating said statistical information, wherein rating includes rating said query object according to a level of compliance with said heuristics; and presenting said rated statistical information in said user-specific report.

2. The computer system of claim 1 further comprising presenting statistical tabulation about said statistical information.

3. The computer system of claim 1 further comprising creating a final report document from said user-specific report.

4. The computer system of claim 1 further comprising presenting said statistical information with formatting that enhances said statistical information.

5. The computer system of claim 1 further comprising enabling a user to determine when said user-specific report is complete.

6. An article of manufacture comprising a program usable storage medium embodying one or more computer usable instructions executable by a computer system to generate a user-specific report, said computer having a database having metadata, said computer having said at least one query object directed to said database, wherein said computer usable instructions executed by the computer system for:

executing said query object against said database by applying user-specific heuristics as rules to said metadata via said executing query object and applying a data-mining statistical tabulation against data in said database and said metadata and thereby collecting statistical information about said query object based on said user-specific heuristics, wherein the user-specific heuristics are embodied in Structured Query Language (SQL) statements;

retrieving at least one view of said statistical information that satisfies said user-specific heuristics, wherein said at least one view includes one of a table view, a column view, and a query view, wherein said table view presents information about columns in a table and query objects that use said table, wherein said column view that presents information about query objects that use a column and tables used in each of said query objects that use said column, and wherein the query view presents information about columns and tables that are used in said query object;

rating said statistical information that satisfies said user-specific heuristics via said at least one view, wherein rating includes rating said query object according to a level of compliance with said heuristics; and presenting said rated statistical information in said user-specific report.

7. The article of manufacture of claim 6 further comprising presenting statistical tabulation about said statistical.

8. The article of manufacture of claim 6 further comprising creating a final report document from said user-specific report.

9. The article of manufacture of claim 6 further comprising presenting said statistical information with formatting that enhances said statistical information.

10. The article of manufacture of claim 6 further comprising enabling a user to determine when said user-specific report is complete.

* * * * *